Figure 1:
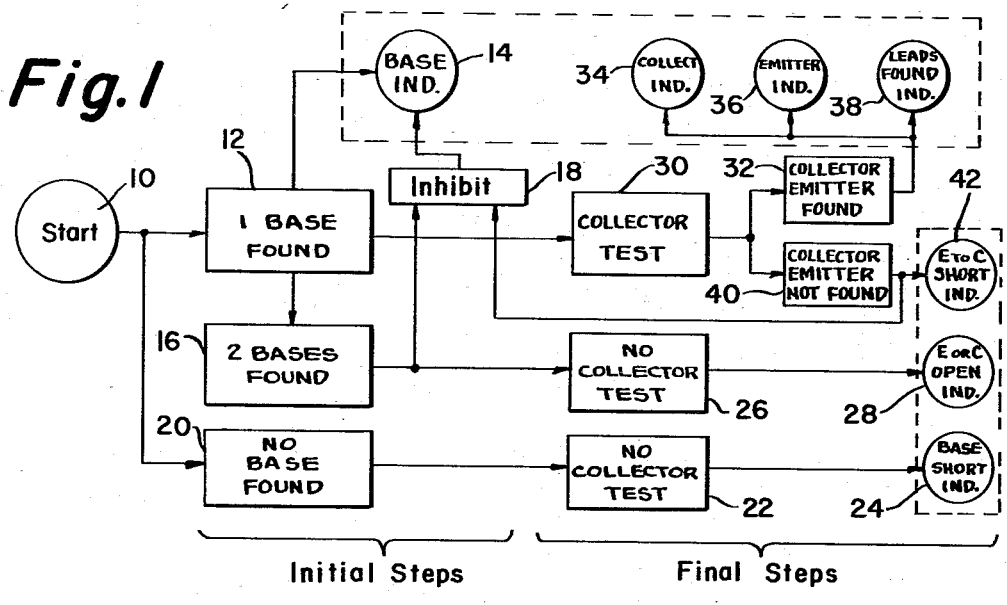

Dec. 5, 1967 T. J. RYAN ETAL 3,356,945
METHOD AND APPARATUS FOR TESTING A TRANSISTOR AND SELECTING
AND IDENTIFYING THE UNKNOWN LEADS THEREOF
Filed April 17, 1962 7 Sheets-Sheet 1

INVENTORS.
THOMAS J. RYAN
IRVINE P. STAPP
BY Jacob Trachtman
ATTORNEY

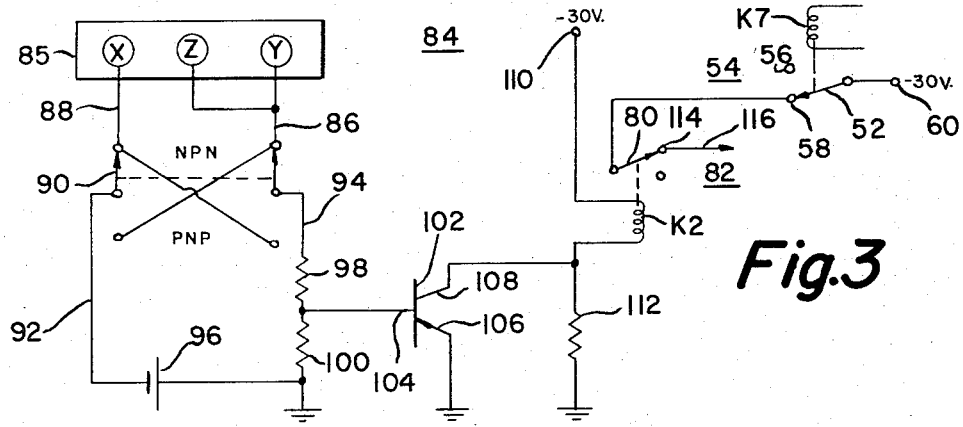
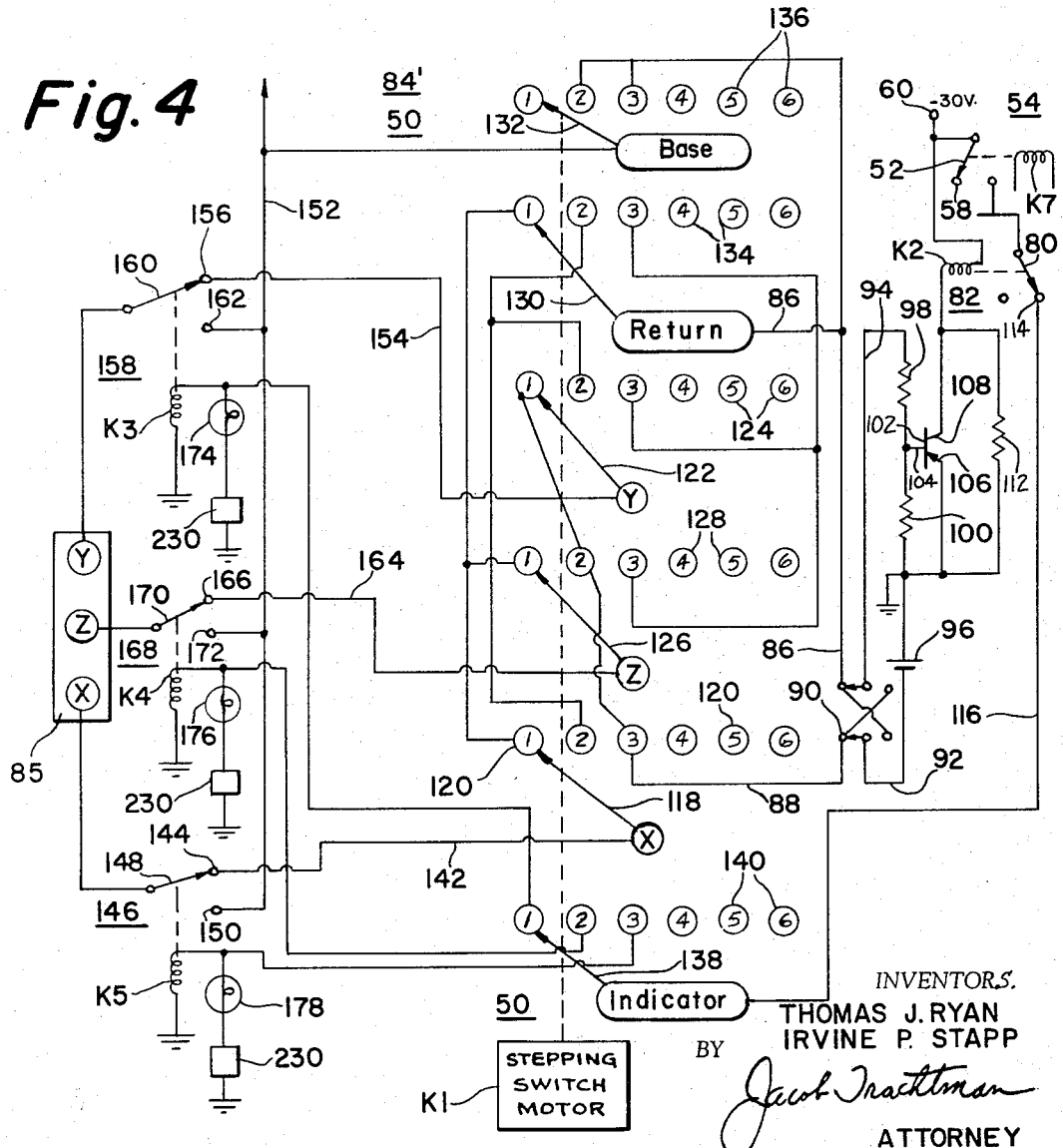

Dec. 5, 1967  T. J. RYAN ETAL  3,356,945
METHOD AND APPARATUS FOR TESTING A TRANSISTOR AND SELECTING
AND IDENTIFYING THE UNKNOWN LEADS THEREOF
Filed April 17, 1962  7 Sheets-Sheet 4

INVENTORS.
THOMAS J. RYAN
IRVINE P. STAPP
BY Jacob Trachtman
ATTORNEY

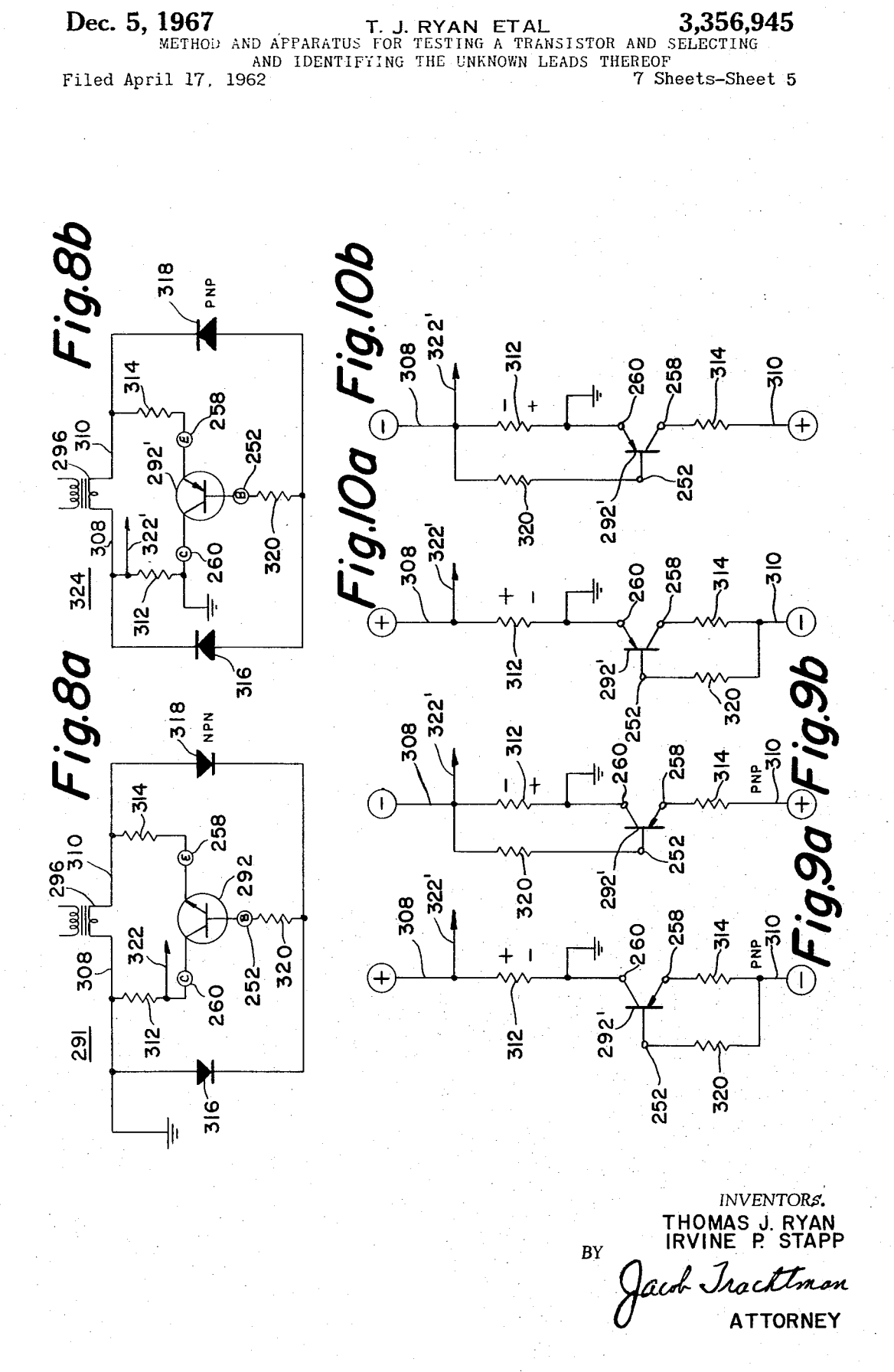

Dec. 5, 1967  T. J. RYAN ETAL  3,356,945
METHOD AND APPARATUS FOR TESTING A TRANSISTOR AND SELECTING
AND IDENTIFYING THE UNKNOWN LEADS THEREOF
Filed April 17, 1962  7 Sheets-Sheet 7

INVENTORS.
THOMAS J. RYAN
IRVINE P. STAPP
BY Jacob Trachtman
ATTORNEY

United States Patent Office 3,356,945
Patented Dec. 5, 1967

3,356,945
METHOD AND APPARATUS FOR TESTING A TRANSISTOR AND SELECTING AND IDENTIFYING THE UNKNOWN LEADS THEREOF
Thomas J. Ryan, Buckingham, and Irvine P. Stapp, Pitcairn, Pa., assignors to American Electronic Laboratories, Inc., Colmar, Pa., a corporation of Pennsylvania
Filed Apr. 17, 1962, Ser. No. 188,079
34 Claims. (Cl. 324—158)

The invention relates to a method for selecting and determining leads of a transistor whose leads may not be known, as well as a method for testing transistors and means for carrying out the method.

Heretofore, testing devices for transistors have been provided. However, a method has not been provided for selecting and determining the leads of a transistor and testing and determining the operativeness of such transistors.

It is, therefore, an object of the invention to provide a new and improved method for selecting and determining the leads of a transistor in a highly reliable and effective manner.

Another object of the invention is to provide a new and improved method for systematically selecting the leads of a transistor by an automatic procedure and determining the operativeness of such transistors.

Another object of the invention is to provide a new and improved means for selecting the leads and testing transistors.

Another object of the invention is to provide a new and improved means for selecting the leads of a transistor, indicating whether the transistor is operative, and automatically connecting the required leads in the transistor to an output circuit.

The above objects, as well as many other objects of the invention, are achieved by providing a method for selecting the base lead of an operative transistor which comprises (a) connecting together a selected two of the three leads of a transistor and applying to the combination a voltage between the connected and unconnected leads of said transistor, (b) determining whether as a result there is a current through the transistor between the leads to which said voltage is applied, (c) performing the steps (a) and (b) for the connections of the pairs of leads of the transistor for the remaining two combinations of said leads, and (d) selecting as the base lead of said transistor the connected lead of the combination of leads which has a result in step (b) different from the results of the remaining two combinations of said leads.

The invention also includes a method of selecting the emitter and collector leads of an operative PNP type transistor which comprises (a) sequentially connecting the first base lead to one of the two remaining second and third leads of a PNP type transistor while applying to the combination a voltage between the connected and unconnected leads of said transistor with the negative polarity of said voltage being applied to the connected leads, (b) comparing the amplitude of current through said second lead of said transistor when said second lead is connected with said first base lead, and when said second lead is unconnected with said first base lead and said third lead is connected with said first base lead, (c) selecting said second lead as the collector lead and said third lead as the emitter lead when the current amplitude through said second lead when connected to said first lead exceeds the current amplitude through said second lead when said second lead is unconnected to said first base lead and said third lead is connected to said first base lead, and (d) selecting said second lead as the emitter lead and said third lead as the collector lead when the current amplitude through said second lead when unconnected to said first base lead and said third lead is connected to said first base lead exceeds the current amplitude through said second lead when said second lead is connected with said first base lead.

The method of selecting the emitter and collector leads of an operative NPN type transistor comprises (a) sequentially connecting the first base lead to one of the two remaining second and third leads of an NPN type transistor while applying to the combination a voltage between the connected and unconnected leads of said transistor with the positive polarity of said voltage being applied to the connected leads, (b) comparing the amplitude of current through said second lead of said transistor when said second lead is connected with said first base lead, and when said second lead is unconnected with said first base lead and said third lead is connected with said first base lead, (c) selecting said second lead as the collector lead and said third lead as the emitter lead when the current amplitude through said second lead when unconnected to said first base lead and said third lead is connected to said first base lead exceeds the current amplitude through said second lead when said second lead is connected to said first base lead, and (d) selecting said second lead as the emitter lead and said third lead as the collector lead when the current amplitude through said second lead when connected to said first base lead exceeds the current amplitude through said second lead when said second lead is unconnected with said first base lead and said third lead is connected to said first base lead.

The means for selecting the base lead of an operative transistor embodying the invention comprises (a) means for receiving the first, second and third leads of an operative transistor, (b) switching means for sequentially connecting together during first, second and third intervals respectively the first and second leads, the first and third leads, and the second and third leads of a transistor received by said first means, (c) means applying a voltage of predetermined sense between the connected and unconnected leads of said transistor during said intervals, and (d) means detecting the presence of current through said transistor between the leads to which said voltage is applied during said intervals for selecting the base of said transistor.

The invention also includes means for selecting the collector and emitter leads of an operative transistor comprising (a) means for receiving the first base lead and second and third leads of an operative transistor, (b) switching means for alternately connecting together during sequential first and second intervals respectively the first and second leads and the first and third leads of a transistor received by said first means, (c) means applying a voltage of predetermined sense between the connected and unconnected leads of said transistor during said intervals, and (d) means detecting the presence of current through said transistor between the leads to which said voltage is applied during said intervals for selecting the collector and emitter leads of said transistor.

Figure 2:
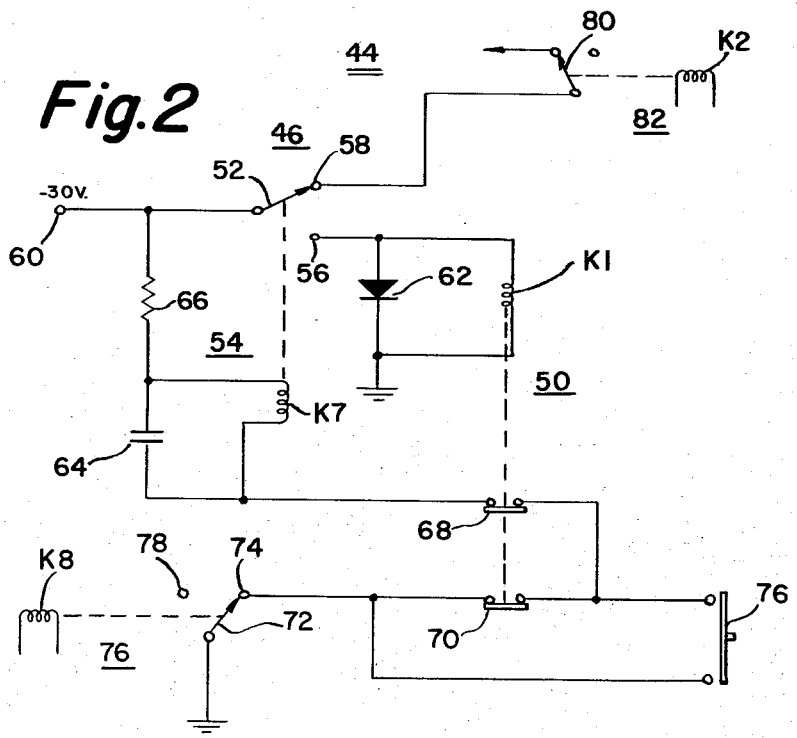
Figure 5:
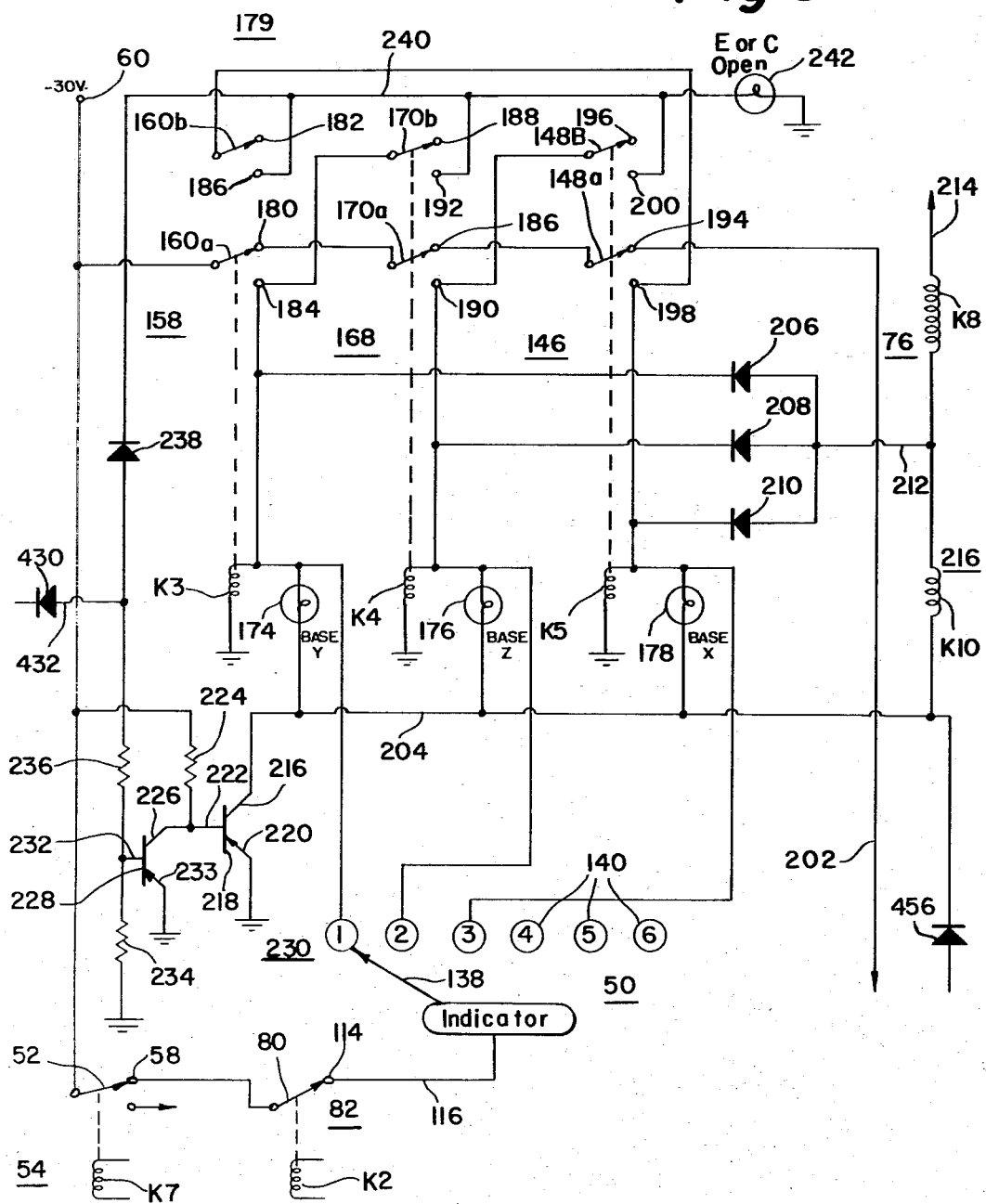
Figure 6:
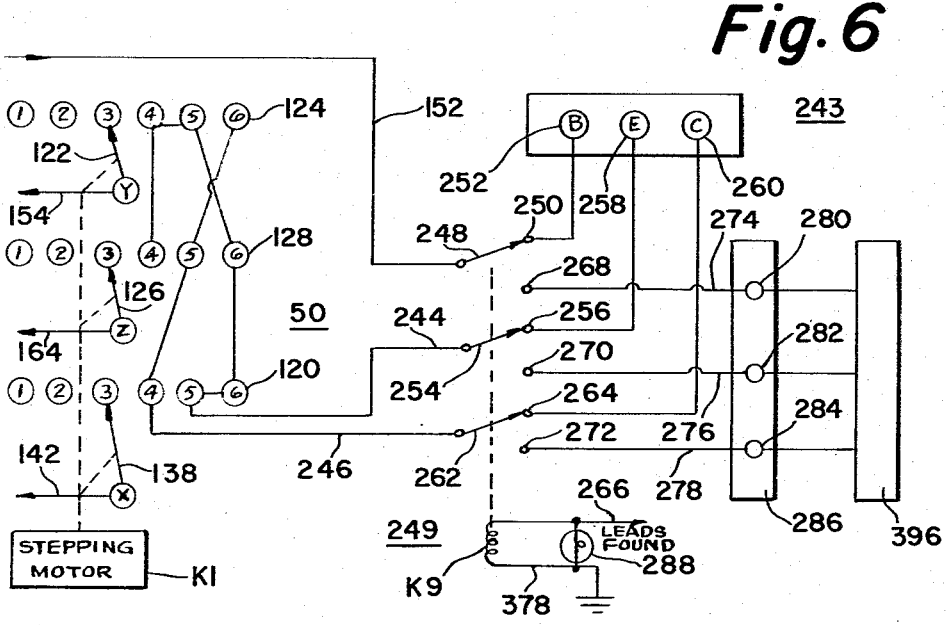
Figure 7:
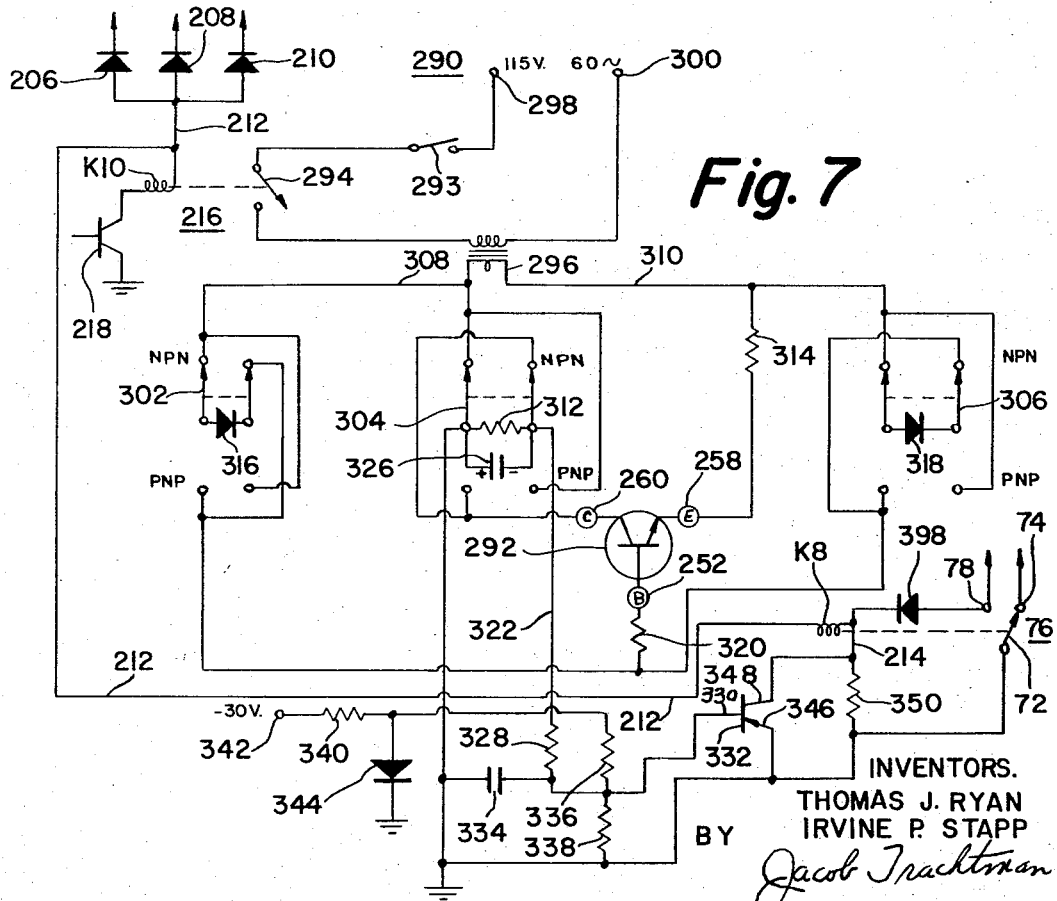

The foregoing and other objects of the invention will become more apparent as the following detailed description of the invention is read in conjunction with the drawings, in which:

FIGURE 1 diagrammatically illustrates in block form the method of the invention, FIGURE 2 is a schematic diagram illustrating the stepping switch control of an automatic transistor lead selecting and testing means including the invention, FIGURE 3 is a simplified schematic diagram of the base finder circuit of FIGURE 4, FIGURE 4 is a schematic diagram illustrating in detail the base finder circuit, FIGURE 5 is a schematic diagram of the base short and emitter or collector open detecting circuit, FIGURE 6 is a schematic diagram of the collector finder switching circuit, FIGURE 7 is a schematic diagram of the collector finder circuit, FIGURES 8a and 8b are simplified diagrams of the equivalent circuit of FIGURE 7 with its switches positioned for testing NPN and PNP type transistors, FIGURES 9a and 9b are equivalent circuits for application of the reverse polarities of the alternating signal applied to the circuit shown in FIGURE 8b.

Figure 11:
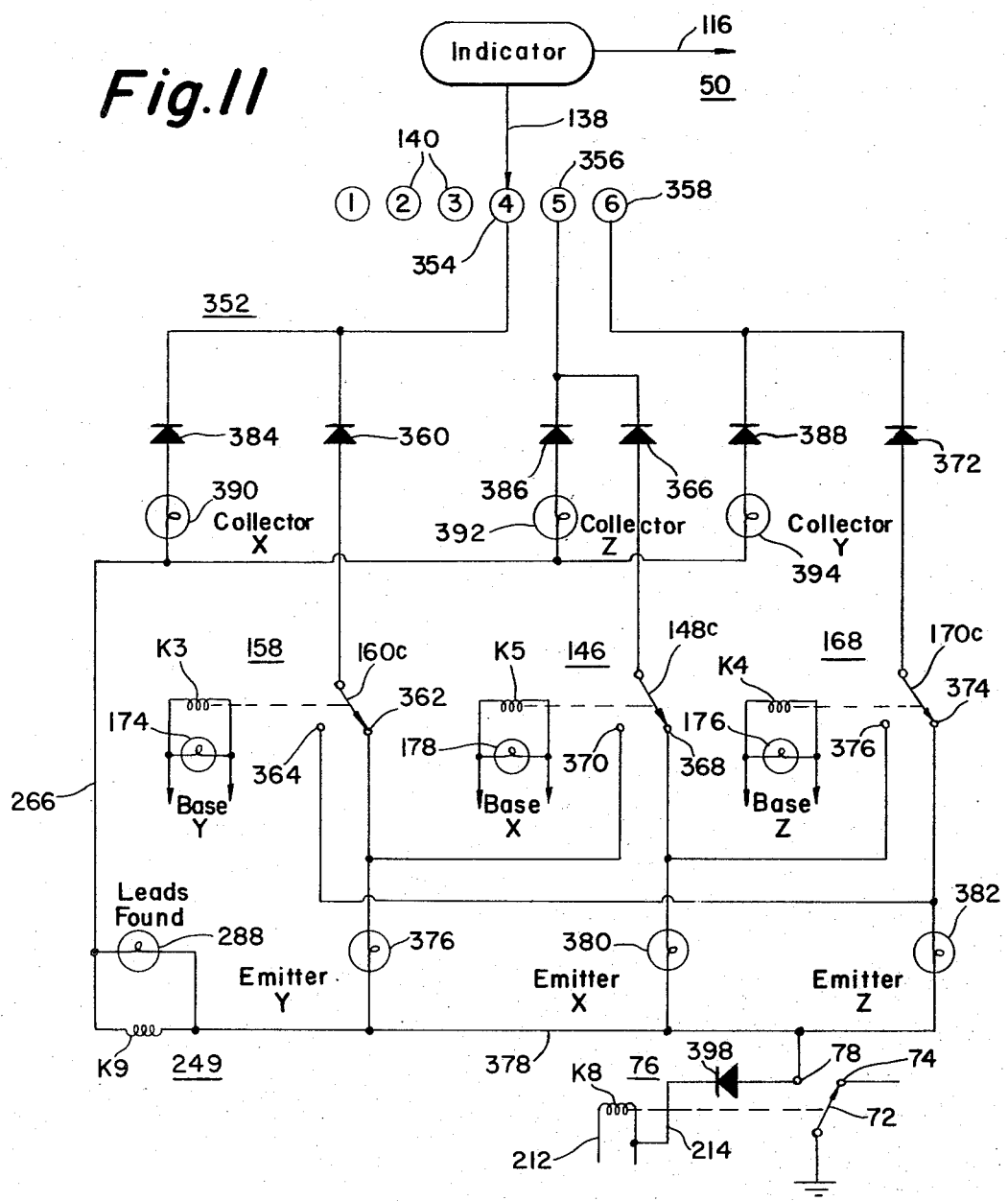
Figure 12:
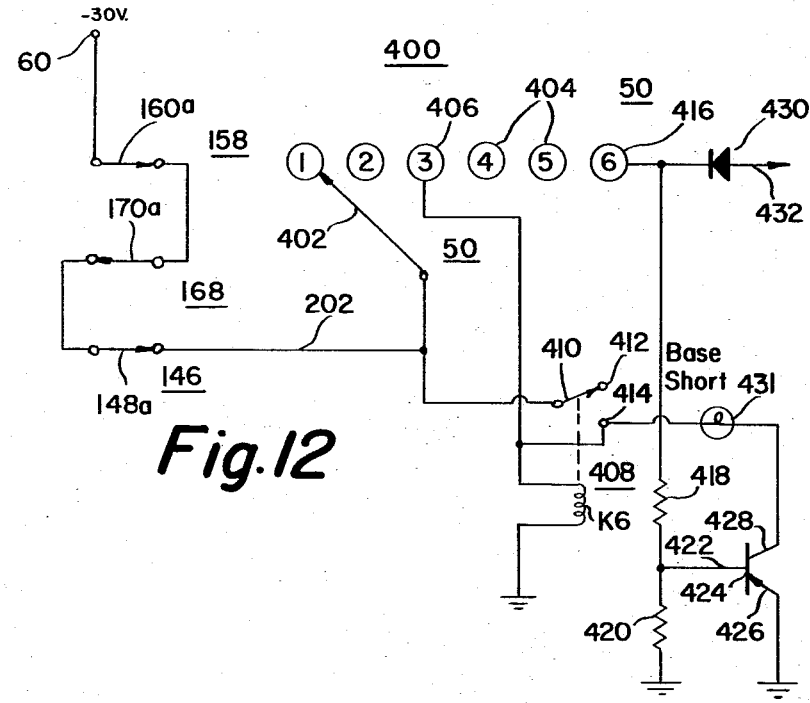
Figure 13:
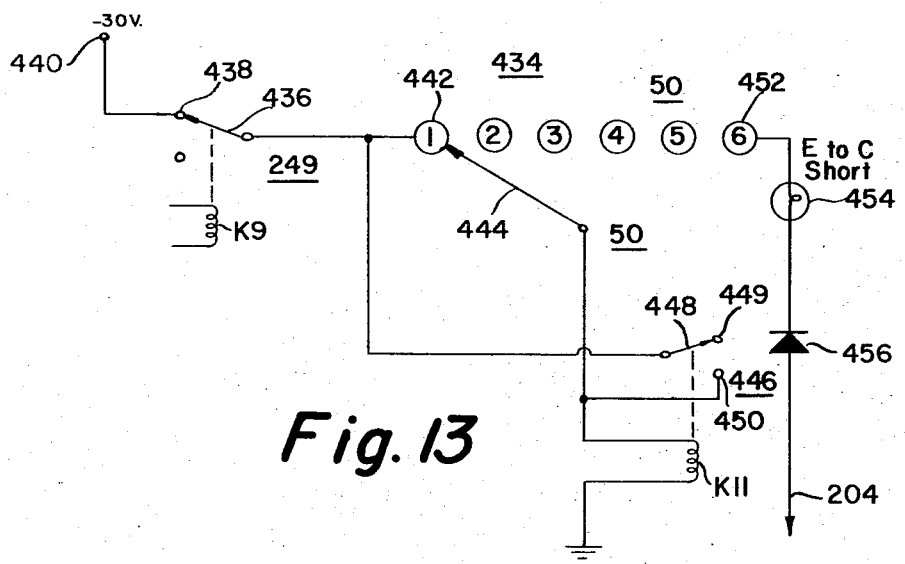

FIGURES 10a and 10b are similar to FIGURES 9a and 9b with the collector and emitter leads reversely connected showing the corresponding arrangement for finding the collector and emitter leads, FIGURE 11 is a schematic diagram of the collector and emitter indicator circuit, FIGURE 12 is a schematic diagram illustrating the base short indicator circuit, and FIGURE 13 is a schematic diagram illustrating the emitter to collector short indicator circuit of the automatic lead selector and testing means.

Like reference numerals designate like parts throughout the several views.

As used herein, it is to be understood that an "unconnected" lead of a transistor under test is the lead which is not connected to the remaining leads of the transistor, while the "connected" leads of the transistor are the leads which are connected together for test purposes as described below.

Refer to FIGURE 1 which is a block diagram generally illustrating the steps of the method for selecting the leads of a transistor and testing the operativeness of a transistor and indicating the results.

The method starts at 10 and proceeds by testing for the base lead of a transistor. When one base lead is found as indicated at 12, a base identification is provided at 14. As the testing continues, a second base lead may be found as shown at 16. This results in the inhibition 18 of the base indication 14. If more than two base leads are found, the result is similar to that for the case when two base leads are found. If no base lead is found as shown by the block at 20, then no collector test 22 is made and a base short is indicated at 24. Similarly, if two or more base leads are found as indicated by block 16, then no collector test results as shown in block 26 and this results in an emitter or collector open indication 28.

Thus, only in a case where one base lead is found 12, a collector test is next made, as indicated by block 30. The collector test may result in the finding of a collector lead and an emitter lead indicated by block 32 with the resultant identification of the collector lead at 34 and the emitter lead at 36, terminating the test with all leads found as shown by the indication at 38.

If, as a result of the collector test 30, the collector lead and emitter lead are not found as shown by block 40, the base indication 14 is inhibited as shown by block 18 with the indication of a emitter to collector short at 42.

In summary, the initial steps of the method outlined in FIGURE 1 comprises testing for the base lead with the result that no base lead or one or more base leads are found. The final steps of the method provide for a collector test of the transistor in the case where one base lead is found, and no collector tests when more than one base or no base lead is found in the initial steps. Where the collector test is made and the collector and emitter leads are found, all of the leads are selected and the transistors found operative. Where a collector test fails to find the collector and emitter leads, then the transistor is found to be inoperative with an emitter to collector short. Similarly, where two base leads are found or no base lead is found and no collector test takes place, the transistor is found to be inoperative respectively with an emitter or collector open, or a base short.

The method in the initial steps of FIGURE 1, for finding one or more base leads or no base leads, and the method of finding the collector and emitter leads as outlined in the final steps of FIGURE 1, will now be described in detail.

The method for selecting a base lead of an operative transistor having a base lead, a collector and an emitter lead comprises connecting together any two of the three leads of a transistor and applying a voltage between the connected and unconnected leads of the transistor. With the voltage thus applied, it is determined whether there results a current through the transistor between the leads to which the voltage is applied. Since three combinations of two connected leads and one unconnected lead are possible with the three leads of the transistor, the above steps are also performed in connection with the two remaining combinations of connections, and whether or not a current results upon the application of a voltage directed in the same sense between the connected and unconnected leads is also determined.

After performing the above steps, the base lead is selected as the unconnected lead of the combination of leads which has a result, either in current flow or absence of current, which is different from the results of the remaining two combinations of leads.

Thus, for example, if an NPN type transistor is being tested and a positive polarity of the voltage is applied to the unconnected lead, current will result only for the combination when the positive potential is applied to the unconnected lead which is the base lead. The other combinations will result in the absence of current. On the other hand, if a negative voltage is applied to the unconnected leads, no current will result when the voltage is applied to the unconnected lead which is a base lead, while current will result in the remaining two cases when the unconnected lead is an emitter or collector lead.

Thus, the result achieved when the unconnected lead is a base lead differs from the results when the emitter or collector leads are the unconnected leads.

In the case where a PNP type transistor is being tested and the negative polarity of the potential is connected to the unconnected lead, a current will result only when the negative potential is applied to the unconnected lead which is a base lead. Similarly, when the positive polarity of the potential is applied to the unconnected lead which is a base lead, current will be absent through the transistor leads to which the voltage is applied, while current will be present when the unconnected lead is either an emitter or collector lead.

Thus, where the unconnected lead is a base lead and the negative or positive polarity of the voltage is applied to the unconnected lead, the result achieved differs from the results provided by the other combinations. The method thereby also determines transistor type providing for the selection as PNP type transistors those which conduct current when the applied voltage has its negative polarity applied to the base lead or do not conduct current when the positive polarity is applied to the base lead. Those transistors are selected as NPN type which do not conduct current when the applied voltage has its negative polarity applied to the base lead or conduct current when the positive polarity is applied to the base lead.

In applying the method to a known NPN type transistor, the presence of current with the application of a positive polarity of the applied voltage to the unconnected lead indicates the unconnected lead to be a base lead, while the application of a negative polarity to the unconnected lead indicates the unconnected lead to be a base lead in the absence of current to the transistor. Thus, a transistor of known type is inoperative if the method results in the finding of none or more than one base lead.

Thus, in applying the method in the case of an NPN type transistor, if the application of the negative polarity of the voltage to the unconnected lead causes current flow for all three combinations, this results in the finding of no base lead. This indicates that the transistor is inoperative and has a base short. If one of the combinations results in the absence of current flow, then one base lead is found. If more than one combination results in the absence of current, then this results in the finding of more than one base lead, indicating an inoperative transistor with the emitter and/or collector open.

Corresponding results are achieved for finding the base lead and determining the operativeness of an NPN type transistor with the positive polarity of the voltage applied to the unconnected lead. In this case, current flow indicates the unconnected lead to be the base lead. Thus, the finding of no base indicates the base lead open, while the finding of more than one base indicates an emitter to collector short.

The method when applied to a PNP type transistor provides results which are correspondingly similar to those obtained for NPN type transistors in finding a base lead and indicating the inoperativeness of the transistor by the finding of less than one or more than one base lead.

A method of selecting the emitter and collector leads of an operative PNP type transistor is provided by the collector test 30 in the final steps of the method illustrated in FIGURE 1, and comprises sequentially connecting the base lead to one of the two remaining second and third leads of a PNP type transistor while applying to the combination a voltage between the connected and unconnected leads of the transistor with the negative polarity of the voltage being applied to the connected leads. The amplitude of current through the second lead of the transistor is compared when the second lead is connected with the first base lead with the amplitude of current through said second lead when said second lead is unconnected with the base lead and the third lead is connected with the base lead.

The second lead is selected as the collector lead and the third lead as the emitter lead when the current amplitude through the second lead when connected to the base lead exceeds the current amplitude through the second lead when the second lead is unconnected to the base lead and the third lead is connected to the base lead. The second lead is selected as the emitter lead and the third lead as the collector lead when the current amplitude through the second lead when unconnected to the first base lead and said third lead is connected to the base lead exceeds the current amplitude through the second lead when the second lead is connected to the base lead.

The method may be carried out for selecting emitter and collector leads of an operative NPN type transistor by sequentially connecting the first base lead to one of the remaining second and third leads of an NPN type transistor while applying to the combination a voltage between the connected and unconnected leads of the transistor with the positive polarity of the voltage being applied to the connected leads. The amplitude of current through the second lead of the transistor when the second lead is connected with the first base lead is compared with the amplitude of current through the second lead when the second lead is unconnected with the first base lead and the third lead is connected with the base lead.

The second lead is selected as a collector lead and the third lead as the emitter lead when the current amplitude through the second lead when unconnected to the first base lead and the third lead is connected to the first base lead exceeds the current amplitude through the second lead when the second lead is connected to the first base lead. The second lead is selected as the emitter lead and the third lead as the collector lead when the current amplitude through the second lead when connected to the first base lead exceeds the current amplitude through the second lead when the second lead is unconnected with the first base lead and the third lead is connected to the first base lead.

The method of the invention for selecting the emitter and collector leads of an operative PNP type transistor may also be carried out by alternately connecting the first base lead to one of the two remaining second and third leads of a PNP type transistor, while applying to the combination a voltage between the connected and unconnected leads of a transistor with a negative polarity of the voltage being applied to the connected leads. The direction and amplitude of current through the second lead of the transistor when the second lead is connected with the first base lead is compared with the direction and amplitude of current through the second lead of the transistor when the second lead is unconnected with the first base lead and the third lead is connected with the first base lead.

The second lead is selected as the collector lead and the third lead as the emitter lead when the current through the second lead is in a direction out of the transistor, while the amplitude of this current exceeds the amplitude of the current through the second lead when the current is in the direction into the transistor. The second lead is selected as the emitter lead and the third lead as the collector lead when the current through the second lead is in the direction into the transistor, while the amplitude of this current exceeds the amplitude of the current through the second lead when the current is in the direction out of the transistor.

In the application of the method to an operative NPN type transistor for selecting the emitter and collector leads, we also alternately connect the first base lead to one of the two remaining second and third leads of an NPN type transistor, while applying to the combination a voltage between the connected and unconnected leads of the transistor with a positive polarity of the voltage being applied to the connected leads. In the next step, we compare the direction and amplitude of current through the second lead of the transistor when the second lead is connected with the first base lead with the direction and amplitude of current through the second lead when the second lead is unconnected with the first base lead and the third lead is connected with the first base lead.

The second lead is selected as the collector lead and the third lead as the emitter lead when the current through the second lead is in the direction out of the transistor, while the amplitude of this current exceeds the amplitude of the current through the second lead when the current is in the direction into the transistor. The second lead is selected as the emitter lead and the third lead as the collector lead when the current through the second lead is in the direction into the transistor, while the amplitude of the current exceeds the amplitude of the current through the second lead when the current is in the direction out of the transistor.

In applying the method for determining the collector and emitter leads, the amplification factor of the transistor or beta is utilized in distinguishing the collector and emitter leads of the transistor. In the case where there is no difference in the amplication factor or beta in the forward and reverse directions, the method indicates an inoperative transistor as shown at 40 in FIGURE 1 and signifies an emitter to collector short circuit. In this manner, the test also checks the amplification factor of a transistor, and where the amplification is sufficiently low or nonexistent, the method determines the inoperativeness of the transistor under test.

The method of the invention may be carried out by many different and distinct devices and is not restricted to the means illustrated in connection with FIGURES 2 to 13 inclusive which disclose a particular form of transistor lead selector and testing means 44 embodying the method of the invention.

Refer to FIGURE 2 which schematically illustrates the motor control circuit 46 of the lead selector and transistor testing means 44. The motor or energizing coil K1 of a stepping switch 50 is energized when the armature 52 of the stepping relay 54 engages the contact 56. When the coil K7 of the relay 54 is de-energized, the armature 52 engages the contact 58 opening the circuit from the negative potential terminal 60 through the coil K1 of switch 50 to ground potential, thus preventing energization of the coil K1. The crystal diode 62 is connected across the energizing coil K1 of the switch 50 to prevent arcing when the circuit through the coil K1 is interrupted.

The coil K7 of stepping relay 54 is bridged by a capacitor 64 and has one side returned to negative potential terminal 60 through a resistor 66 and the other side connected to ground potential through the series connected interrupter contacts 68 and home contacts 70 of the relay 50, and armature 72 engaging the contact 74 of a de-energized collector finder and stop stepping relay 76. When this circuit is completed, a voltage is developed across the capacitor 64 which after a sufficient build up time results in the energization of the coil K7 of the relay 54. This causes the armature 52 of the relay 54 to contact the terminal 56, thereby energizing the stepping switch 50 and causing the stepping switch 50 to be actuated to its next position. The stepping switch 50 is provided with six positions. The rate at which the stepping switch 50 moves from one position to the next is determined by the resistance-capacitance (RC) constant of the resistor 66 and capacitor 64. In the present application, the stepping rate of 6 steps per second has been found satisfactory.

When the stepping switch 50 is in its sixth or last position which is designated the home position, the home contacts 70 are open. This prevents the stepping switch 50 from being actuated until the interrogate switch 76 which is connected across the home contact switch 70 is closed.

The interrupter contacts 68 are opened upon the energization of the motor or coil K1 of the stepping switch 50 and are again closed after the stepping switch 50 has assumed its next position and the coil K1 has been de-energized. The interruption of the energization of the coil K7 of the stepping relay 54 by the opening of contacts 68, results in the return of the armature 52 to its de-energized position contacting the terminal 58 while disengaging the terminal 56. This provides for the de-energization of the coil K1 of the stepping switch 50. After the time required by the RC time constant, the coil K7 of the stepping relay 54 is again sufficiently energized to actuate the armature 52 for energizing the switch 50 causing it to step to its next position.

Energization of the coil K8 of relay 76 causes the armature 72 of relay 76 to disengage its contact 74 and engage the contact 78, preventing the energization of the stepping relay 54, thereby preventing the stepping of the stepping switch 50. The operation of relay 76 will be described in greater detail below in connection with FIGURE 5.

The terminal 58 of relay 54 is connected with the armature 80 of a base finder relay 82 having an energizing coil K2. The relay 82 will also be described below in greater detail in connection with FIGURES 3 and 4.

FIGURE 3 is a schematic diagram illustrating the base finder circuit 84 of the means 44, in simplified form.

The receptacles X, Y and Z of transistor input connecting means 85 are adapted for receiving the three leads of a transistor. Two of the receptacles at a time, such as the Y and Z receptacles, are connected together through line 86, while the remaining unconnected receptacle X is connected to the line 88. A reversing switch 90 connects the line 88 to line 92, and the line 86 to line 94 when an NPN type transistor is received by the receptacles X, Y, Z. In its alternate position, the switch 90 connects line 88 to the 94 and line 86 to line 92 for the case when a PNP type transistor is received by the connecting means 85. The negative electrode of the battery 96 is connected to the line 92, while its positive electrode is returned to ground potential. The line 94 is returned through series connected resistors 98, 100 to ground potential.

A PNP type transistor 102 which has its base lead 104 biased so that it normally is not conducting, has its emitter lead 106 returned to ground potential, while its collector lead 108 is returned through the energizing coil K2 of the base finder relay 82 to the negative potential terminal 110. The collector lead 108 of the transistor 102 is also connected through a resistor 112 to ground potential.

In operation, when an NPN type transistor has its leads received by the receptacles X, Y and Z of the input connecting means 85 and the base lead is received by the receptacle X, a voltage is applied by the battery 96 across the unconnected lead and the connected leads of the transistor. Since, as assumed, the negative polarity of the voltage of the battery 96 is applied to the base lead which is received by a receptacle X, current will not flow through the transistor. This will not affect the voltage applied to the base lead 104 of the transistor 102, so that it will remain nonconducting. The current which flows through the coil K2 of the base finder relay 82 will thus be limited by the resistor 112. This results in the relay 82 remaining de-energized with its armature 80 engaging its contact 114 delivering a negative potential to line 116 from the terminal 60 through the relays 54 and 82.

It is noted that the relay 54 interrupts the circuit to the line 116 when the coil K7 of the relay 54 is energized. This prevents the delivery of the negative potential 116 during a stepping operation of the stepping switch 50 and avoids the delivery of an indication that the base lead had been found by the base finder circuit 84.

Thus, in the operation of the base finder circuit 84, the negative potential signal is delivered to the line 116 in the absence of current flow through the transistor when a base lead is connected to line 92. This is the resulting condition for an operative NPN type transistor when the negative polarity of the voltage of the battery 96 is applied to the unconnected lead of the transistor being tested when the unconnected lead is the base lead. As noted in connection with the description of the method for selecting the base lead of an NPN type transistor, the absence of current flow under these circumstances is used as a criterion for determining and selecting the base lead.

If the receptacle X receives a lead other than the base lead, then the application of the potential across the unconnected and connected leads with the negative polarity applied to the unconnected (not connected to Y or Z) receptacle X, results in current flow through the transistor. With the flow of current, the potential delivered to the electrode 104 of the transistor 102 is sufficiently negative going to result in conduction of the transistor 102. This increases the current flow through the coil K2 of the relay 82 energizing the coil K2 and causing the armature 80 to disengage the contact 114. This prevents the delivery of the negative potential from the terminal 60 to the line 116 indicating that a base lead has not been found.

Of course, as illustrated in connection with the description of the method, the positive polarity may also apply to the unconnected lead of the NPN transistor for determining the base lead when current flows through the transistor. In that case, the circuitry would be appropriately modified to provide the desired indication.

Similarly, for testing PNP type transistors, the switch 90 is reversed from its position shown in FIGURE 3 so that the positive polarity of the battery is applied to the receptacle X which is unconnected with the receptacles Y and Z. Thus, when the base lead of the PNP type transistor is received by receptacle X, no current will result indicating the base lead is found in the receptacle X. When either the collector or emitter leads are received in the unconnected receptacle X, current results, thereby giving a result corresponding to that in connection with the testing of an NPN type transistor.

Refer to FIGURE 4 which discloses in detail the base finder circuit 84'. The base finder circuit 84' includes means for switching the connections between the receptacles X, Y and Z which are not shown in FIGURE 3.

The circuit 84' includes the X armature 118 which contacts the six contacts 120 of a stepping switch 50, while a Y armature 122 engages six corresponding contacts 124, and the Z armature 126 engages the six contacts 128. Each armature 118, 122, 126 engages a corresponding one of its six contacts for each of the six positions of the stepping switch 50.

The stepping switch 50 is also provided with a return armature 130 which respectively engages one of the six contacts 134 for each of the six positions of the switch 50, and a base armature 132 which similarly engages a respective one of the six contacts 136.

An indicator armature 138 of the switch 50 also engages one of the six contacts 140 respectively for each of the six positions of the stepping switch 50.

The X armature 118 of the stepping switch 50 is connected by a line 142 to the contact 144 of a relay 146 which is provided with an energizing coil K5. When the energizing coil K5 is energized, the armature 148 disengages the contact 144 and engages a contact 150 which connects to a base lead line 152. The base lead line 152 also is joined to the base armature 132 of the stepping switch 50.

The Y armature 122 of the stepping switch 50 is connected by a line 154 to the contact 156 of a relay 158 which has an energizing coil K3. When the energizing coil K3 is energized, the armature 160 disengages the contact 156 and engages the contact 162 which also connects to the base lead line 152.

The Z armature 126 of the stepping switch 50 is connected by a line 164 to the terminal 166 of a relay 168 which has an energizing coil K4. The armature 170 normally engages the contact 166, and disengages the contact 166 engaging the contact 172 when the relay 168 is energized. The contact 172 is also connected to the base lead line 152.

The indicator armature 138 which is connected with the line 116 is returned to ground potential when stepping switch 50 is in its first position through the energizing coil K3 of relay 158 and respectively returned to ground potential through the energizing coils K4 and K5 of relays 168 and 146 when the armature 138 of the said switch 50 is in its second and third positions contacting the second and third contacts 140.

The terms "first" and "second" contacts of the stepping switch 50 are used to designate the contacts engaged by the armatures such as the armatures 118, 122, 126, 130, 132, 138 of the stepping switch 50 when the stepping switch is respectively in its "first" and "second" positions of its six possible positions. Other contacts of the stepping switch 50 are similarly represented in correspondence with the six positions of the stepping switch 50.

Each of the energizing coils K3, K4, K5 of the relays 158, 168, 146 respectively is provided with a bulb 174, 176, 178 connected across it to ground potential through a base light cancel circuit 230 described in detail in connection with FIGURE 5. The bulbs 174, 176, 178 thus connected are energized simultaneously with the energization of their associated coil.

With the stepping switch in its first position, the connections of FIGURE 4 show that the X and Z receptacles are connected together and returned by the armature 130 to the line 86, while the receptacle Y is joined to the line 88, provided that the relays 146, 158 and 168 are de-energized.

In the second position of the stepping switch 50, the receptacles X and Y are joined together and connected to the line 86, while the Z receptacle is joined to the line 88.

For the third position of the stepping switch 50, the receptacles Y and Z are connected together and joined to the line 86, while the receptacle X is connected to the line 88. The third position of the stepping switch thus represents the connections shown in FIGURE 3 for the simplified base finder circuit 84.

The stepping switch thus provides the three possible combinations of leads, whereby two of the leads are connected together with one remaining unconnected (not connected to the other leads) lead. For each position the unconnected lead is connected to the line 88 and receives the negative polarity of the battery 96 when an NPN type transistor is to be tested, while receiving positive polarity applied to the unconnected lead when a PNP type transistor is to be tested. The two connected leads received by the connected receptacles are joined with line 86 which is returned to ground through the resistors 98 and 100. The operation of the normally nonconducting transistor 102 for detecting the presence of the base lead when received in the unconnected receptacle has been explained in connection with the description of FIGURE 3.

Thus, if a base is found for any one of the first three positions of the stepping switch 50, a negative potential is delivered to the line 116 from the terminal 60. This potential energizes the relays 158, 168 and 146 respectively depending upon whether the base lead is found in the first, second or third positions of the stepping switch 50.

If the base lead is found in the first position of the stepping switch 50, then the receptacle Y receives the unconnected base lead of the transistor under test and the energization of the relay 158 results in the connection by its armature 160 of the receptacle Y to the base lead line 152. Similarly, if the base lead is found in position two or three of the stepping switch 50, then the receptacle Z or the receptacle X receives the base lead of the transistor being tested. The corresponding relays 168, 146 would then be energized to connect the receptacle Z or X receiving the base lead to the base lead line 152. Energization of one of the relays 158, 168, 146 also results in the energization of its associated bulb 174, 176, 178 indicating respectively that the base lead is found in the receptacle Y, Z or X. The holding circuits for relays 158, 168, 146 are shown and described below in connection with FIGURE 5.

Since the receptacle X, Y or Z which is found to have received the base lead is disconnected by its respective relay 146, 158, 168 from its armature 118, 122, 126 of the stepping switch 50, the base armature 132 connects the lead 152 to the line 86, so that the found base lead can be connected to the remaining leads to continue the testing for such additional base leads which may result. The remaining tests which are provided by the connections of the first three positions of the stepping switch 50 will be carried out. Since the found base lead had been connected to line 88 in the step in which the test is made for finding the base lead, the connection of the line 152 to which the found base lead is now connected should be made to the line 86 for the tests which are to follow. This is apparent from the fact that, depending upon the position of the stepping switch 50 in which the base lead is found, the following tests require the connection of the base lead with either the collector or emitter leads to the line 86, or both sequentially to the line 86 for the following tests.

The importance of continuing the tests during the first three positions for all three possible combinations of connected and unconnected leads of a transistor, even after finding one base lead, is to determine whether more than one base lead can be found. The finding of more than one base lead, of course, indicates that any first found base lead may not truly be the base lead and that the transistor has been found inoperative by the test performed. The finding of more than one base lead under the conditions described indicates an emitter or collector lead is open circuited.

Of course, if a base lead is not found during the tests made in the first three positions of the stepping switch 50, then none of the relays 168, 158, 146 is energized. This also indicates an inoperative transistor with a short circuited base as shown at 24 in FIGURE 1. This results in none of the receptacles X, Y or Z being connected to the base lead line 152.

The connections of the contacts of the stepping switch 50 for the fourth, fifth and sixth positions are not shown in FIGURE 4, for purposes of simplicity. These connections are shown in greater detail and described below in connection with FIGURE 6.

The relays 146, 158, 168 are each provided with three additional armatures and associated contacts, two sets of which are shown in connection with the schematic drawing of the base short and emitter to collector open detecting circuit 179 of FIGURE 5, while the third set is shown in connection with the collector and emitter indicator circuit of FIGURE 11.

In the base short and emitter to collector open detecting circuit of FIGURE 5, the relay 158 is shown to have an armature 160a engaging the contact 180, and an armature 160b engaging the contact 182 when its coil K3 is de-energized. Upon energization of the relay 158, the armature 160a engages the contact 184 and armature 160b engages the contact 186.

Similarly, relay 168 is provided with armatures 170a and 170b respectively engaging the contacts 186, 188 when the relay is not energized, while engaging the contacts 190, 192 when the relay is energized. The relay 146 is also provided with armatures 148a and 148b respectively engaging the contacts 194, 196 when de-energized, and engaging the contacts 198, 200 when energized. When de-energized, the armatures 160a, 170a and 148a of the respective relays 158, 168 and 146 provide a series path from the negative potential terminal 60 to the base short line 202 which is connected to the base short indicator circuit shown in FIGURE 12. With the energization of one or more of relays 158, 168, 146, the circuit between the terminal 60 and base short line 202 is opened, preventing delivery of a negative potential to the line 202.

Each of the contacts 184, 190 and 198 of the relays 158, 168 and 146 is returned to ground through its respective energizing coil K3, K4 and K5. The terminals 184, 190 and 198 are also connected through the respective bulbs 174, 176, 178 to the line 204. The contacts 184, 190 and 198 are also connected to the cathodes of respective diodes 206, 208, 210 which have their anodes joined to line 212. The line 212 is connected to the line 204 by the energizing coil K10 of a collector test relay 216 which is shown in greater detail in connection with the collector finder circuit of FIGURE 7. Line 212 is also connected to line 214 through the energizing coil K8 of the collector finder and stepping relay 76 which is also shown in greater detail in FIGURE 11. The line 204 is connected to the collector 216 of a normally conducting PNP type transistor 218 which has its emitter lead 220 returned to ground potential and its base lead 222 connected through a resistor 224 to the negative potential terminal 60.

The base lead 222 is also connected with the collector lead 226 of a transistor 228 to provide a base light cancel circuit 230. The emitter 233 of the transistor 228 is returned to ground potential while its base lead 232 is also connected to ground potential through a resistor 234, so that the transistor 228 is normally nonconducting.

The base lead 232 of the transistor 228 of circuit 230 is also connected through a resistor 236 to the anode of a crystal diode 238 which has its cathode joined to line 240. The line 240 is returned to ground potential through an emitter or collector open circuit indicating bulb 242. The terminals 186, 192, 200 of the relays 158, 168 and 146 are also joined to the line 240.

The armature 160b of relay 158 is also connected to the contact 198 of relay 146, while the armature 170b of relay 168 is connected to the contact 184 of relay 158, and the armature 148b of relay 146 is connected to the contact 190 of relay 168.

In operation of the base short and emitter or collector open detecting circuit 179, starting with the stepping switch 50 in its first position with the armature 138 engaging the first contact of the contacts 140, the delivery of the negative potential from the terminal 60 depends upon relays 54 and 82 having their armatures 52 and 80 respectively engaging their terminals 58 and 114. The armature 52 of relay 54 engages its contact 58 after a stepping operation has been completed by the stepping switch 50. The armature 80 of the base finder relay 82 engages its contact 114 only when a base found indication occurs for a test during the first, second and third positions of the stepping switch 50. With the base found in the first position of the switch 50, a negative potential is delivered to the energizing coil K3 of relay 158. This results in the energization of the relay 158. Similarly, the relays 168 and 146 are respectively energized if a base is found in the second and third positions of the stepping switch 50.

If, for example, we assume that a base is found in the first position of the stepping switch 50, the relay 158 is energized and the negative potential delivered to the base short line 202 is removed by the opening of the circuit by the armature 160a of relay 158 which disengages the contact 180 and engages the contact 184. Upon engaging the contact 184, the relay 158 has its coil K3 energized directly by the circuit from the terminal 60 through the armature 160a and coil K3 to ground potential, thus providing a holding circuit. A bulb 174 which is returned to ground potential through the normally conducting transistor 218 is also energized indicating that a base lead has been found in the receptacle Y.

From the similarity of the circuitry for relays 168 and 146, if instead of relay 158, relay 168 is energized during the second position of the stepping switch 50, a holding circuit for relay 168 is provided, and a holding circuit will also be provided for relay 146 if the base is found only in the third position of the stepping switch 50. Correspondingly, the bulbs 176 or 178 will be energized indicating respectively that the corresponding receptacle Z or X contains a found base of the transistor under test.

In the event that after the three positions of the stepping switch 50 have been assumed and the base finder relay 82 has not been energized, in each case indicating that a base has not been found, then the negative potential derived from the terminal 60 is delivered to the base short line 202.

The case will now be described where more than one base lead is indicated or found by the tests performed during the first three positions of the stepping switch 50. Assuming that a base was found in position one, the relay 158 is energized and the bulb 174 indicates that a base lead has been found in the receptacle Y. If a second base lead is found in the second position of the stepping switch 50, then the relay 168 is also energized. This results in a negative potential being delivered to the line 240 from the terminal 60 through the armature 160a of relay 158 which engages the terminal 184 and the armature 170b of relay 168 which engages the terminal 192. This results in the energization of the bulb 242 which indicates that an emitter or collector lead is open circuited. A negative voltage on line 240 is also delivered through the armature 160b which engages the contact 186 of relay 158 to the terminal 198 of relay 146 and through the energizing coil K5 of relay 146, thus energizing relay 146. The relay 146 also provides for energizing coil K4 of relay 168 from the line 240 through the armature 148b which enages contact 200 of relay 146, thus constituting a holding circuit.

In a like manner, if relay 158 is energized and then relay 146 is energized, relay 168 will also be energized and all of the relays maintained in their energized condition. This is also the result if relay 168 is first energized, after which relay 146 is energized, in which case this results in the energization of relay 158 and the maintenance of all three relays in their energized condition.

Thus, with the finding of more than one base lead and the concurrent energization of two of the relays 158, 168, 146, all of the relays 158, 168, 146 are energized and maintained in the energized state by the holding circuits provided by the illustrated circuitry of the relays 158, 168 and 146.

The energization of more than one of the relays 158, 168, 146 results in the delivery of a negative potential from terminal 60 to line 240 which is applied through the diode 238 to the base lead 232 of the transistor 228. The base lead 232, thereby, goes negative causing the transistor 228 to become conductive. This results in the base lead 222 of transistor 218 going positive, causing the nonconduction of transistor 218. The line 204 is thus not returned to ground potential by transistor 218 and the bulbs 174, 176, 178 are extinguished so that they do not indicate a found base lead.

Upon the energization of one of the relays 158, 168, 146 responsive to the finding of one base lead, the negative potential from the terminal 60 is also delivered by one of the armatures 160a, 170a, 148a of the respectively energized relay 158, 168, 146 through a respective diode 206, 208, 210 to the line 212. The diodes 206, 208, 210 prevent a sneak path from one to the other of the terminals 184, 190, 198 upon the energization of one of the relays 158, 168, 146. The return to ground potential of line 212 through the energizing coil K10 of relay 216 and the conducting transistor 218 results in the activation of relay 216 when a negative signal is received by line 212. With the negative potential on the line 212, the energizing coil K8 of the collector finder and stop stepping relay 76 is also in condition for energization as is more clearly seen in FIGURE 7 which will be described below.

In the case where more than one base lead is found, it is noted that the transistor 218 of the base light cancel circuit 230 becomes nonconducting. This results in the de-energization of the coil K10 of relay 216. This disables the collector test for the transistor under test which would take place in the fourth, fifth and sixth positions of the stepping switch, which test is described in connection with FIGURE 7.

Thus, if one base lead is found, the lead selecting and testing means 44 proceeds with a test to determine the collector and emitter leads referred to as the collector test.

The collector finder switching circuit 243 is shown in FIGURE 6 and illustrates the connections of the lines 142, 154 and 164 and contacts 120, 124 and 128 associated with the X, Y and Z armatures respectively of the stepping switch 50 in the fourth, fifth and sixth positions, which connections were omitted for simplicity in FIGURE 4.

When the stepping switch 50 is in its fourth position, which corresponds to the first of the three steps utilized in the collector test, the line 154 is connected through the armature 122 to a line 244, while the line 164 is also connected to the line 244 through the armature 126, and the line 142 is returned through the armature 138 to a line 246.

The base line 152 (see also FIGURE 4) is connected to B terminal 252 through the armature 248 of a lead transfer relay 249 which, when de-energized, engages contact 250. The line 244 is connected through the armature 254 engaging the contact 256 to the E terminal 258, and the line 246 is connected to the C terminal 260 through the armature 262 engaging the contact 264.

Upon the receipt of the negative polarity upon the line 266, the coil K9 of the relay 249 is energized causing its armatures 248, 254 and 262 to respectively engage their lower contacts 268, 270, 272. This results in the direct connection of the lines 152, 244, 246 with respective lines 274, 276, 278. Line 274 is connected with the base terminal 280, while the line 276 is connected to the emitter terminal 282 and the line 278 is connected to the collector terminal 284 of an output receptacle 286. Upon energization of the coil K9 of the relay 249, the leads found bulb 288 which is connected across the coil K9 is also energized. The circuit for energizing the relay 249 by delivering a negative potential to the line 266 is shown and described in greater detail in connection with FIGURE 11.

When the stepping switch 50 is in its fifth position, the line 154 is connected with line 142 to the line 244, while the line 164 is joined to the line 246. In the sixth position of the stepping switch 50, the line 154 is joined to the line 246 through the armature 122, while the lines 164 and 142 are both connected through their armatures 126, 138 to line 244.

Since one of the leads received by the receptacles X, Y or Z shown in FIGURE 4 of the transistor under test is a found base lead, it has been disconnected from one of the lines 154, 164, 142 and connected to the base lead line 152. As previously explained, only the two remaining lines are respectively connected to the collector and emitter leads received by the receptacles of transistor input means 85. Thus, if the line 164 is disconnected in the fourth position of the stepping switch 50, the line 154 will be connected over the line 244 and relay 249 to the E terminal 258, while the line 142 is joined over line 246 and through the relay 249 to the C terminal 260.

In the fifth position of the stepping switch 50, the lines 154 and 142 are connected together to line 244, while the disconnected line 164 is connected to the line 246. Therefore, in this position, no collector test takes place.

In the sixth position, the line 154 is connected over line 246 of the relay 249 to the C terminal 260, while line 142 is connected over the line 244 and through the relay 249 to the E terminal 258. Thus, in the fourth and sixth positions, the lines 154, 142 respectively are connected to the E and C terminals 258, 260, with their connections being reversed from one position to the other position.

Similarly, if the line 154 had been initially connected to the found base lead of the tester transistor and was, therefore, now disconnected, the collector test would take place with line 164 and line 142 connected and reversely connected to the E and C terminals 258 and 260 in the fourth and fifth positions of the stepping switch. Also, for the case where the line 142 is disconnected from the found base lead of the transistor under test, the collector test takes place for the lines 154 and 164 during the fifth and sixth positions of the stepping switch 50 when they are connected to the E and C terminals 258 and 260 respectively and reversely connected for the sixth position.

The collector finder circuit 290, which is schematically illustrated in FIGURE 7, shows the B, E and C terminals 252, 258 and 260 directly connected to the leads of a transistor 292 being tested by means of the connections provided by the collector finder switching circuit 243 for one of the last three (fourth, fifth or sixth) positions of the stepping switch 50.

When the on-off switch 293 is closed and the relay 216 is energized (FIGURE 5) by the finding of only one base lead of the transistor 292 being tested, its armature 294 closes the circuit for providing energization to the transformer 296 from the terminals 298, 300 receiving alternating current. Energization of the transformer 296 conditions the collector finder circuit 290 to perform the collector test during the two positions of the fourth, fifth and sixth positions of the stepping switch 50 when the terminals 258 and 260 are connected in direct and reverse order with the collector and emitter leads of the transistor 292. The switches 302, 304 and 306 are shown positioned in FIGURE 7 to perform the collector test for an NPN type transistor such as the transistor 292 indicated in FIGURE 7. The equivalent circuit is shown in FIGURE 8a for the circuit connected with the B, E and C terminals 252, 258 and 260 and with the switches 302, 304 and 306 positioned for testing an NPN type transistor 292. FIGURE 8b shows the equivalent circuit connected with the B, E and C terminals 252, 258, 260 of FIGURE 7 when the switches 302, 304 and 306 are set in their alternate positions for testing a PNP type transistor 292'.

Considering in detail the simplified collector testing circuit 291 of FIGURE 8a, the transformer 296 is a step down voltage type which delivers a reduced alternating voltage to the lines 308, 310 of its secondary winding. The line 308 is connected by a resistor 312 to the C terminal 260, while the lead 310 is similarly returned by a resistor 314 to the E terminal 258. The lines 308, 310 are respectively connected to the anodes of crystal diodes 316, 318 which have their cathodes connected through a resistor 320 to the B terminal 252. The lead 308 is returned to ground potential and a test lead 322 is connected to the terminal 260.

When the line 308 is positive and the line 310 is negative with respect thereto, the diode 318 is nonconducting, while the diode 316 conducts effectively connecting the terminal 252 with the line 308 through the resistor 320. On the next half of the cycle, the line 308 is negative and the line 310 is positive, the diode 318 conducts effectively connecting the terminal 252 with the positive potential line 310, while the diode 316 is nonconducting, providing an open circuit between the terminal 252 and line 308.

The collector finder circuit 324 of FIGURE 8b is equivalent to the collector testing circuit 290 associated with the transistor 292, where the switches 302, 304 and 306 are set for testing a PNP type transistor 292'. The circuit 324 is identical to the circuit 291 except that the diodes 316, 318 have their polarities reversed, while the terminal 260 is grounded and a test lead 322' is connected to the line 308.

In operation, the circuit 324 provides a connection between the line 310 and the terminal 252 when a positive voltage is delivered to line 308 and the negative voltage is upon line 310. During the following half cycle, when the polarities are reversed and the positive potential is on line 310 and the negative potential is on line 308, the diode 316 is conductive, connecting the terminal 252 through the resistor 320 to the line 308, while the diode 318 is nonconducting. In effect, as in connection with the NPN type transistor test circuit 291, the B terminal 252 is alternately connected with the line 308 and 310. Thus, the terminal 252 is connected to the negative potential when the negative potential is delivered to either the lines 308 or 310.

As a further illustration, refer to FIGURES 9a and 9b for the test circuit of a PNP type transistor 292' of FIGURE 8b. In this illustration, the base terminal 252 is switched from lines 308 to 310 to receive a negative potential for rendering the PNP type transistor 292' conductive, for the purposes of the collector test. However, in the case of the NPN type transistor 292 of FIGURE 8a, the base terminal 252 is switched from line 308 to line 310 to receive a positive potential for rendering the transistor 292 conductive for performing the collector test.

FIGURE 9a shows the half cycle when the positive potential is delivered to the line 308 and the negative potential is applied to line 310. Thus, the negative potential is applied to the base terminal 252 for rendering the transistor 292' conductive. However, a negative potential is applied to the terminal 258 which connects to the emitter of the transistor 292', while a positive potential is applied to the terminal 260 which connects with the collector of the PNP type transistor under test. Since reverse polarities are applied to the emitter and collector of the transistor 292', a reverse current flows through the transistor 292, providing the reverse beta or amplification which is smaller than the forward beta or amplification provided by the forward current.

In FIGURE 9b the next half cycle is shown during which the negative polarity is applied to the line 308 and a positive polarity is received by line 310. Again the negative voltage is applied to the base of the transistor 292' rendering it conductive, while the positive potential is received by its emitter, and the negative potential is applied to its collector. The transistor 292' thereby has applied to its emitter and collector the proper polarities for providing forward current resulting in the forward beta or amplification of the transistor 292'. It is thus noted that the polarity of the voltage drop across the resistor 312 differs in FIGURES 9a and 9b and are opposite to each other due to the reversal of current flow. A greater current also flows through the resistor 312 in the forward direction in FIGURE 9b than through the resistor 312 in the reverse direction in FIGURE 9a. Thus, if the voltage drop is averaged over a cycle and a signal is derived over line 322' of the circuit 324, an average negative signal will result for indicating that the emitter lead is connected to the terminal 258, while the collector electrode of the PNP type transistor 292' is connected to the terminal 260.

FIGURES 10a and 10b show the case where the PNP type transistor 292' under test has its collector connected to terminal 258 while its emitter is joined to terminal 260. FIGURE 10a shows the negative potential of line 310 for the first half cycle applied to the collector, while the positive potential is connected to the emitter of the transistor 292'. This provides a forward current resulting in a forward beta or amplification which provides the greater voltage drop across the resistor 312 compared to the arrangement shown in FIGURE 10b.

FIGURE 10b shows the positive potential of line 310 during the second half of the cycle supplied to the collector of transistor 292', while the emitter receives a negative potential on line 308 providing for reverse current flow and reverse beta amplification. The voltage drop across the resistor 312, therefore, is smaller in this case than for the first half cycle shown in FIGURE 10a. The polarity of voltage drop is also reversed. Thus, if an average is taken over a cycle of the voltage drop across the resistor 312 for the condition shown in FIGURES 10a and 10b, the average voltage will be positive on the line 322'. This serves to indicate that the collector is connected to line 258, while the emitter of the PNP type transistor 292' under test is connected to the terminal 260. The above description given of FIGURES 9 and 10 in connection with a PNP type transistor is also applicable to the NPN type transistor shown in FIGURE 8a for transistor 292. In the case of the NPN type transistor, forward current flows in the direction from the collector to emitter of transistor 292 so that the positive potential is applied to the collector, while the negative potential is applied to the emitter to produce forward amplification. As also seen in FIGURE 8a, the line 308 is returned to ground potential, while the test signal is derived over line 332 at the terminal 260. This is done because the terminal 260 will be negative with respect to ground potential when the transistor 292 is providing forward amplification. Thus, the average over the cycle will provide a negative average voltage when the emitter is connected to the terminal 258 and the collector is joined to terminal 260. However, when the emitter is connected to terminal 260 and the collector is joined to terminal 258, a positive average voltage will be derived over the line 322.

Thus, there is a correspondence in the test signals derived over the lines 322 and 322' of circuits 291 and 324 of FIGURES 8a and 8b. This is evidence from the fact that a negative average signal will be derived over the line 322, 322' for the NPN and PNP type transistors under test in said respective circuits when the emitter lead of the transistor is connected to terminal 258, while a positive average signal is delivered when the collector is connected to the terminal 258.

Refer now again to FIGURE 7 in which the circuit 290 is shown with the NPN type transistor 292 under test. As noted in connection with FIGURE 6 during the fourth, fifth and sixth positions of the switch 50, collector tests will take place. In one of these switch positions, the emitter of the transistor 292 being tested will be connected to the terminal 258 and the collector will be connected to the terminal 260, while during another one of the switch positions, the connections will be reversed.

17

The effect of such reversals was illustrated in connection with FIGURES 9 and 10 for a PNP type transistor.

FIGURE 7 shows the emitter lead connected to the terminal 258 of the NPN type transistor 292 and the collector lead connected to the terminal 260. When thus connected, as illustrated above in FIGURE 8a, the transistor 292 provides negative average signal on line 322. An integrating capacitor 326 is connected across resistor 312 to provide a average signal on line 322. Line 322 is connected through a resistor 328 to the base lead 330 of a PNP type transistor 332. The base lead 330 is returned to ground through a second integrating capacitor 334 to provide additional signal averaging. The transistor 332 has its base lead 330 provided with a biasing voltage for maintaining it nonconductive by being connected to the junction of resistors 336, 338 which are series connected from ground potential through a resistor 340 to a negative potential terminal 342. A zener diode 344 returns the negative potential terminal 342 to ground potential through the resistor 340 to provide voltage regulation.

The emitter lead 346 of transistor 332 is directly connected to ground potential, while its collector lead 348 is returned through a resistor 350 to ground potential and connects directly to line 214.

In operation, after the base lead has been found during the first three positions of the stepping switch 50, a negative potential is applied to the line 212 (FIGURE 5) which causes current to flow through the energizing coil K8 of the collector finder and stop stepping relay 76 and resistor 350 to ground potential. The current through the coil K8 is limited by the resistance of resistor 350, so that it is just insufficient to energize the relay 76 under the conditions where the transistor 332 is nonconducting.

With the transistor 292 connected with the terminals 252, 258, 260 of the testing means 44 as shown in circuit 290, an average negative voltage is developed on line 322 during the collector test illustrated by FIGURE 7, which is delivered to the base lead 330 of the transistor 332, rendering it conductive. This allows sufficient current to pass through the energizing coil K8 of relay 76 to energize relay 76. Of course, if the collector and emitter leads were connected in reverse to that shown in FIGURE 7, then a positive voltage would be delivered to line 322 which would have no effect upon the nonconducting state of the transistor 332 and the relay 76 would remain de-energized. Thus, the relay 76 will be energized only for the condition when the leads of the transistor 292 or 292' are connected as shown in FIGURE 7. Since there are only two possible arrangements for connecting the emitter and collector leads of transistor 292 to terminals 258, 260, the connection required for energizing relay 76 will occur during one of the fourth, fifth or sixth positions of the stepping switch 50. The energization of relay 76 thus indicates that the particular connections sought have been found and from this information, the collector and emitter leads of the transistor 292 are determined.

In the case where there is no difference between forward and reverse amplification of the transistor 292 under test, then the negative potential on line 322 will be zero and the relay 76 will not be energized for any of the fourth, fifth or sixth positions of the stepping switch 50. Such a condition indicates a collector to emitter short circuit.

The energization of relay 76 causes the armature 72 to disengage the contact 74, while engaging the contact 78 (FIGURES 7 and 11). Upon the disengagement of contact 74, the ground return path of the stepping relay 54 shown in FIGURE 2 is opened, preventing its energization and preventing the stepping of the stepping switch 50 from the position during the collector test in which the relay 76 is energized.

Refer to FIGURE 11 which schematically illustrates the collector and emitter indicator circuit 352. As seen from FIGURE 5, a negative potential is delivered during the fourth, fifth or sixth positions of the stepping switch 50 to the line 116 when the stepping relay 54 is not energized, and the base finder relay 82 is deactivated subsequent to the base finding positions shown in FIGURE 4.

The armature 138 of the stepping switch 50 engages its terminals 354, 356 and 358 of the set of terminals 140 sequentially during the fourth, fifth and sixth positions. Although this set of terminals 140 are shown in FIGURES 4 and 5, their connections with the indicator circuit 352 are not shown for purposes of simplicity.

The terminal 354 is connected to the cathode of the crystal diode 360 which has its anode connected to the armature 160c of the relay 158. The armature 160c engages the terminal 362 when the relay 158 is de-energized, while engaging the contact 364 upon the energization of relay 158.

Similarly, the contact 356 is connected through a diode 366 to the armature 148c of relay 146. The armature 148c engages the contact 368 when the relay 146 is de-energized, while engaging the terminal 370 when the relay 146 is energized.

The contact 358 is connected by crystal diode 372 to the armature 170c of relay 168. The armature 170c engages the contact 374 when the relay 168 is de-energized, while it engages the contact 376 upon energization of relay 168.

The contact 362 of relay 158 is directly connected to contact 370 of relay 146, while contact 364 of relay 158 is directly joined to the contact 374 of relay 168. The contact 368 of relay 146 is also directly connected to the contact 376 of relay 168.

The terminal 362 of relay 158 is also connected through Y emitter indicator bulb 376 to line 378, while contact 368 of relay 146 is joined to line 378 by X emitter indicator bulb 380 and terminal 374 of relay 168 is connected by Z emitter indicator bulb 382 to line 378.

The terminals 354, 356 and 358 of stepping switch 50 are also respectively connected to the cathodes of diodes 384, 386, and 388 having their anodes connected to line 266 through respective X, Z and Y collector indicator bulbs 390, 392 and 394.

FIGURE 6 shows the energizing coil K9 of the lead transfer relay 249, as well as the lines 266 and 378. For simplicity, the line 378 of FIGURE 6 is shown returned directly to ground. However, more specifically, FIGURE 11 shows that line 378 is returned to ground through the armature 72 of the collector finder stop stepping relay 76, when relay 76 is energized and its armature 72 engages its contact 78. It is noted that relay 76 is energized when a transistor 292 under test is found to have its collector lead connected to the terminal 260 (FIGURE 7).

Upon the completion of a collector test upon the energizing of the relay 76, the collector and emitter indicator circuit 352 operates as follows to indicate the positions of the collector and the emitter leads.

Since a collector test takes place after only a single base lead has been found, only one of the relays 158, 146, 168 will be energized.

If the relay 76 is energized in the fourth position of the stepping switch 50, the armature 138 engages contact 354 and line 378 is returned to ground potential. Current will flow through the collector indicating bulb 390 indicating that the transistor under test has its collector lead received in the terminal X of the transistor input means 85 (see FIGURE 4). Similarly, the bulb 392 will be energized if the collector test results in the energization of relay 76 when the armature 138 engages the contact 356 in the fifth position of the stepping switch 50. The energization of bulb 392 indicates that the terminal Z receives the collector lead of the transistor under test. The energization of the relay 76 when the stepping switch 50 is in its sixth position with its armature 138 contacting the terminal 358, results in the energization of bulb 394 indicating that the found collector lead is received by the terminal Y of the transistor input means 85 shown in FIGURE 4. The above indications by the bulbs 390, 392 and 394 is confirmed by reference to FIGURES 4 and 6 which show the connections of the leads from the input means 85 to the terminals 252, 258 and 260 of the collector finder circuit 290 of FIGURE 7.

When the line 378 is returned to ground potential and one of the collector indicating bulbs 390, 392, 394 is energized to show in which receptacle of the input means 85 the collector lead is found, its current also passes through the leads found bulb 288 and lead transfer relay 249. The energization of bulb 288 indicates that all of the transistor leads have been found. At this time, the found base lead is connected to terminal 280, the found emitter lead is connected to terminal 282, and the found collector lead of the transistor under test is connected to terminal 284 by the energization of relay 249. The terminals of the output receptacle 286 may be connected with a circuit 396. The means 44 may receive a transistor with unknown leads on its input means 85 with its leads in any order or arrangement and automatically connect the appropriate leads of the transistor to the output receptacle 286 and thereby into the circuit 396 (FIGURE 6).

The indicator circuit 352 also indicates the terminal of input means 85 in which the emitter lead of the leads of the transistor under test is received. When the collector lead is found in the fourth position of the stepping switch 50, then the X collector indicator bulb 390 is energized and either the Y emitter bulb 376 or Z emitter bulb 382 is energized, depending upon whether or not relay 158 is energized. If relay 158 is energized indicating that the base lead of the transistor was found in receptacle Y, its armature 160c engages contact 364 resulting in the energization of the bulb 382 indicating that the emitter lead is received in receptacle Z. If the relay 158 is not energized showing that the base lead is not found in receptacle Y, then the Y emitter indicator bulb 376 is energized showing that the emitter lead of the transistor being tested is received in the receptacle Y of the input means 85.

Similarly, if relay 76 is energized in the fifth position of the stepping switch 50, the collector indicator bulb 392 is energized indicating that the collector lead of the transistor is received in the receptacle Z. The X emitter indicator bulb 380 is energized showing that the emitter lead is received in receptacle X provided the relay 146 is de-energized. If relay 146 is energized showing that the base lead is received in receptacle X, the Y emitter indicator bulb 376 is energized indicating that the emitter of the transistor under test is received in terminal Y of input means 85.

In a like manner, the finding of the collector lead by the collector test in the sixth position of the stepping switch 50, energizes the Y collector indicator bulb 394 indicating that the collector lead of the transistor under test is received in receptacle Y, while also energizing the Z emitter indicator bulb 382 when the relay 168 is de-energized. If the relay 168 is energized for the condition when the base lead of the transistor is found in terminal Z, then the X emitter indicator bulb 380 is lit showing that the emitter lead is received in the receptacle X of input means 85.

Since the energization of the relay 76 prevents further stepping of the switch 50, the stepping switch 50 remains in the position during which the collector test found the collector lead and energized the relay 76. As clearly seen from FIGURE 7, the energization of relay 76 also provides a holding circuit for maintaining relay 76 energized by the return path provided for its coil K 8 through the armature 72 to ground potential through the diode 398 having its anode connected to the terminal 78 of the relay 76 and its cathode connected to one end of the coil K8 which is returned to ground by the resistor 350.

In such condition, the leads found bulb 288 is energized and one base indicator bulb 374, 376, 378, one collector indicator bulb 390, 392, 394 and one emitter indicator bulb 376, 380, 382 are energized, indicating the respective X, Y and Z receptacles of input means 85 receiving the leads by the lead selecting testing apparatus 44. By its operation, the base, collector and emitter leads of a transistor received in the receptacles X, Y and Z of the input means 85 in any arbitrary order, are properly connected through the armatures 122, 126, 138 (FIGURE 4) of the stepping switch 50 and the contacts (FIGURE 6) of the energized relay 249 to the appropriate output terminals 280, 282, 284 of the output receptacle 286 for utilization in any circuit 396 for testing or other purposes. The leads of the transistor, however, will not be connected to the output receptacle 286 if the transistor is found to be defective either by having short or open circuits, or providing insufficient amplification.

FIGURE 12 schematically illustrates the base short indicator circuit 400. The line 202 receives the negative potential from terminal 60 through the series connections of the relays 158, 168 and 146 when they are concurrently in a de-energized state as explained in detail in FIGURE 5. Line 202 connects to an armature 402 of the stepping switch 50. Six contacts 404, one for each of the six positions of the stepping switch 50, are provided for being sequentially engaged by the armature 402. The contact 406 of the set of contacts 404 is engaged by the armature 402 in the third position of the stepping switch 50 and is connected through the energizing coil K6 of a base short relay 408 to ground potential.

The armature 410 of relay 408 is connected with line 202 and engages the contact 412 when the relay 408 is de-energized. The armature 410 disengages the contact 412 and engages contact 414 upon energization of the relay 408. The contact 414 is also connected with the contact 406 of the stepping switch 50.

The contact 416 of the set of contacts 404 is engaged by the armature 402 when the stepping switch 50 is in its sixth position and is connected to ground through the series connected resistors 418, 420. The junction of resistors 418, 420 is joined to the base lead 422 of a normally nonconducting PNP type transistor 424. The emitter lead 426 of transistor 424 is directly joined to ground potential, while its collector lead 428 is returned through a base short indicating bulb 431 to the terminal 414 of relay 408.

The contact 416 of switch 50 is also connected to the cathode of crystal diode 430 which has its anode joined to an indicator cancel line 432. The indicator cancel line 432 is connected through the resistor 236 to the base lead 232 of the transistor 228 of the base light cancel circuit 230 shown in FIGURE 5.

At the beginning of a transistor lead selecting or testing operation, all of the relays of the apparatus are de-energized and the stepping switch 50 proceeds to step from its sixth position through its first, second and third positions. Upon reaching the third position, a circuit is completed through the coil K6, energizing the relay 408, provided that the relays 158, 168 and 146 are all de-energized closing the circuit to the terminal 60 and delivering a negative potential on line 202.

In stepping to the fourth, fifth and sixth positions of the stepping switch 50, the relay 408 is maintained in its energized state by the path through the relays 158, 168, 146, the armature 410 engaging the contact 414 of relay 408, and through the energizing coil K6 to ground potential. The negative potential is also applied through the base short indicator bulb 431 to the collector lead 428 of the transistor 424 via the armature 410 when the relay 408 is energized.

If a base lead has not been found during the first three positions of the stepping switch 50, a collector test will not take place during the final three positions of the stepping switch. In the sixth position of the stepping switch 50, the armature 402 will engage the contact 416. At this time, a negative potential will be applied to the base lead 422 of the transistor 424 rendering it conductive. The base short indicator bulb 431 will be energized for indicating that the base lead of the transistor under test is short circuited.

The negative signal from contact 416 of the stepping switch 50 will also be delivered through diode 430 to line 432 and impressed upon the base lead 232 of normally nonconducting transistor 228 shown in FIGURE 5 of the base light cancel circuit 230. The transistor 228 will become conductive, thereby rendering nonconducting the transistor 218. This has the effect of disconnecting line 204 from ground potential and prevents an emitter to collector short indication which will be described in connection with the emitter to collector short indicator circuit 434 of FIGURE 13.

The holding circuit activated by the stepping switch 50 in its third position by the energization of the relay 408 is provided for preventing a base short indication when the armature 402 has not engaged the contact 406 before engaging the contact 416 of switch 50. Such a situation may occur when the armature 402 is positioned in the fourth, fifth or sixth positions of the switch 50 at the termination of a previous test. In that case, when the next test is initiated, the armature 402 must proceed from its last position in which a previous test was terminated to the first position of the stepping switch 50 in which the new test proceeds to determine the base lead of the transistor.

In order to proceed with the new test, the means 44 is de-energized, thereby causing all of the relays to assume their de-energized positions. Thus, when the armature 402 engages the contact 416 before it engages the contact 406, the relay 408 will not be energized. This prevents conduction of transistor 424 since the collector 428 of transistor 424 does not receive a negative potential, so that the base short indicator bulb 431 is not energized.

When a complete test is performed and the stepping switch 50, starting at its first position, passes through its third position without finding a base lead, relay 408 will be energized and the base short indicator bulb 431 will indicate a base short when the relay 402 engages the contact 416 of the stepping switch 50. The armature 402 of stepping switch 50 will not terminate its test in the fourth or fifth positions of the stepping switch 50, since in the absence of found base lead, the collector test relay 216 (FIGURE 5) will not be energized, preventing operation of the collector finder circuit 290 of FIGURE 7. Hence, the non-operation of the circuit 290 will cause the stepping relay 50 to proceed to its home position engaging the contact 416. The stepping relay 50 will remain in the final position in view of the opening of the contacts 70 of the stepping switch 50 in its sixth or last position as illustrated in FIGURE 2.

Referring to FIGURE 13, the emitter to collector short indicator circuit 434 includes the armature 436 of the leads transfer relay 249 which engages contact 438 when relay 249 is de-energized and disengages the contact 438 when relay 249 is energized. The contact 438 is connected to a terminal 440 provided with a negative potential, while the armature 436 of relay 249 is joined to the contact 442 which is engaged by the armature 444 of stepping switch 50 in its first position.

The armature 444 of stepping switch 50 is returned to ground through the energizing coil K11 of an emitter to collector short relay 446. The armature 448 of relay 446 engages its contact 449 when the relay 446 is de-energized, while it engages contact 450 upon the energization of relay 446.

The contact 452 of the switch 50 is engaged by the armature 444 in its sixth or home position and is connected through an emitter to collector short indicator bulb 454 to the cathode of a crystal diode 456. The anode of diode 456 is joined to line 204 which is connected to the collector lead 216 of the transistor 218 of the base light cancelling circuit 230 as shown in FIGURE 5.

In operation, upon the initiation of a test, the armature 444 engages the contact 442 of the stepping switch 50. Provided that all of the relays of the apparatus have been properly de-energized at the initiation of the testing operation, the leads found relay 249 and relay 446 are de-energized at this time. With the relay 249 de-energized, the negative potential from terminal 440 is applied through the armature 444 to the energizing coil K11 of relay 446, resulting in the energization of relay 446. With the relay 446 energized and its armature 448 engaging the terminal 450, a holding circuit is completed through the armature 436 of de-energized relay 249 maintaining the relay 446 in its energized state.

If, during the fourth, fifth or sixth positions of the stepping switch 50, all of the leads of the transistor under test are found, relay 249 is energized, and the circuit through the energizing coil K11 of relay 446 is interrupted, resulting in its de-energization. Thus, the engagement of the armature 444 with the contact 452 will not result in the flow of current through the indicator bulb 454 for showing an emitter to collector short circuit in the transistor under test.

It is also noted that the indicator bulb 454 will not be energized unless during the test operation the armature 444 engages the contact 442 before engaging the contact 452. Thus, in the case where a previous test has occurred and the stepping switch 50 is de-energized in its fourth, fifth or sixth positions, the armature 444 will engage the sixth contact 452 before it engages the first contact 442 for the subsequent test. Under these circumstances, relay 446 is not energized and energization of the bulb 452 will be prevented since a complete test at that time has not been performed.

Another condition for energizing bulb 454 to indicate an emitter to collector short circuit of the transistor under test when the stepping switch 50 is in its sixth position, is that the line 204 be returned to ground potential to complete the circuit. As seen from FIGURE 5, line 204 is returned to ground potential through the normally conducting transistor 218 of the base light cancel circuit 230. In the case where a base lead short circuit is found by the circuit 400 of FIGURE 12, the transistor 218 of circuit 230 will be rendered nonconductive. This will prevent the energization of the emitter to collector short indicator bulb 454.

The energization of the indicator bulb 454 and the application of the negative potential to line 204 of FIGURE 5 results in the de-energization of the particular indicator bulb 174, 176, 178 which indicated the base found during the first three positions of the stepping switch 50. This is the result because the application of negative potentials to both sides of the base indicator bulbs results in an insufficient voltage differential across the bulbs to provide an indication.

Thus, the transistor lead selecting and testing apparatus, in addition to finding and indicating the leads of an operative transistor, provides means for indicating that the transistor is inoperative and the conditions under which such inoperativeness has been determined. Thus, where not one base lead has been found, the base short indicator bulb 431 is energized (FIGURE 12) for indicating that the base lead of the transistor under test is short circuited. In the case where two or more base leads are found during the first three positions of the stepping switch 50, the emitter or collector open indicator bulb 242 of FIGURE 5 is energized. Where all of the leads are not found during the fourth, fifth and sixth positions of the stepping switch 50, but only one base lead was found, the emitter to collector short indicator 454 of FIGURE 13 is energized for showing the inoperative condition of the transistor under test.

Of course, although a particular embodiment has been disclosed carrying out the method of the invention, the method may be performed by entirely different apparatus and is in no manner restricted to the particular form of apparatus described and claimed.

It will, of course, be understood that the description and drawings, herein contained, are illustrative merely, and that various modifications and changes may be made

What is claimed is:
1. The method for selecting the base lead of an operative transistor with unknown leads which comprises:
    (a) connecting together a selected two of the three leads of a transistor and applying to the combination a voltage of predetermined sense between the connected and unconnected leads of said transistor,
    (b) determining whether as a result there is a current through the transistor between the leads to which said voltage is applied,
    (c) performing the steps (a) and (b) for the connections of the pairs or leads of the transistor for the remaining two combinations of said leads after disconnecting the previously connected leads with said voltage applied in the same said predetermined sense between the connected and unconnected leads of said transistor,
    (d) and designating as the base lead of said transistor the unconnected lead of the combination of leads which has a result in step (b) substantially different from the results of the remaining two combinations of said leads.

2. The method of claim 1 for determining transistor type in which in step (a) a D.C. voltage of predetermined sense is applied between the connected and unconnected leads of said combinations of leads of said transistor for selecting the base lead in step (d) and includes:
    (e) designating as PNP type transistors those which conduct current in step (b) when the applied voltage has its negative polarity applied to the base lead or do not conduct current when the positive polarity is applied to the base lead,
    (f) and designating as NPN type transistors those which conduct current in step (b) when the applied voltage has its positive polarity applied to the base lead or do not conduct current when the negative polarity is applied to the base lead.

3. The method for selecting the base lead of an operative transistor with unknown leads which comprises:
    (a) connecting together a selected two of the three leads of a transistor and applying to the combination a voltage of predetermined sense between the connected and unconnected leads of said transistor,
    (b) determining whether there is a current through the transistor between the leads to which said voltage is applied,
    (c) performing the above steps (a) and (b) for the connections of the pairs of leads of the transistors for the remaining two combinations of said leads after disconnecting the previously connected leads with said voltage applied in the same said predetermined sense between the connected and unconnected leads of said transistor,
    (d) and designating as the base lead of said transistor the unconnected lead of the combination of leads which:
        (1) resulted in the absence of current between the leads to which said voltage was applied provided that no other combinations of leads also resulted in the absence of current, or
        (2) resulted in current between the leads to which said voltage was applied provided that no other combinations of leads also resulted in current.

4. The method of claim 3 for determining transistor type in which in step (a) a D.C. voltage of predetermined sense is applied between the connected and unconnected leads of said combinations of leads of said transistor for selecting the base lead in step (d) and includes:
    (e) designating as PNP type transistors those which conduct current in step (b) when the applied voltage has its negative polarity connected to the base lead or those which do not conduct current in step (b) when the applied voltage has its positive polarity applied to the base lead,
    (f) and designating as NPN type transistors those which conduct current in step (b) when the applied voltage has its positive polarity connected to the base lead or those which do not conduct current in step (b) when the applied voltage has its negative polarity applied to the base lead.

5. The method for selecting the base lead of an operative PNP or NPN type transistor with unknown leads which comprises:
    (a) connecting together a selected two of the three leads of a PNP or NPN type transistor and applying to the combination a D.C. voltage between the connected and unconnected leads of said transistor with the positive polarity applied to the unconnected lead of a PNP type transistor while for an NPN type transistor the negative polarity is applied to the unconnected lead,
    (b) performing step (a) for the connections of the pairs of leads of the transistor for each of the remaining two combinations of siad leads after disconnecting from each other the previously connected leads,
    (c) determining for which one of the three different combinations of leads of said transistor provided by step (a) there results an absence of a current through the transistor between the leads to which said voltage is applied,
    (d) and designating as the base lead of said transistor the unconnected lead of the combination of leads for which there results the absence of current in step (c).

6. The method for selecting the base lead of an operative PNP or NPN type transistor with unknown leads which comprises:
    (a) connecting together a selected two of the three leads of a PNP or NPN type transistor and applying to the combination a D.C. voltage between the connected and unconnected leads of said transistor with the negative polarity applied to the unconnected lead of a PNP type transistor while for an NPN type transistor the negative polarity is applied to the unconnected lead,
    (b) performing step (a) for the connections of the pairs of leads of the transistor for each of the remaining two combinations of said leads after disconnecting from each other the previously connected leads,
    (c) determining for which one of the three different combinations of leads of said transistor provided by step (a) there results a current through the transistor between the leads to which said voltage is applied,
    (d) and designating as the base lead of said transistor the unconnected lead of the combination of leads for which there results a current in step (c).

7. The method of selecting the unknown collector and emitter leads of an operative PNP or NPN type transistor in which the base lead is known which comprises:
    (a) sequentially connecting the first base lead to one and then to the other of the two remaining second and third unknown leads of a PNP or NPN type transistor while applying to the combination a voltage between the connected and unconnected leads of said transistor with the negative polarity of said voltage being applied to the connected leads of a PNP type transistor while for an NPN type transistor the positive polarity is applied to the connected leads,
    (b) comparing the amplitude of current through said second lead of said transistor when said second lead is connected with said first base lead, and when said second lead is unconnected with said first base lead and said third lead is connected with said first base lead,
    (c) designating said second lead as the collector lead and said third lead as the emitter lead when the current amplitude through said second lead when connected to said first base lead exceeds the current amplitude through said second lead when said second lead is unconnected to said first base lead and said third lead is connected to said first base lead, (d) and designating said second lead as the emitter lead and said third lead as the collector lead when the current amplitude through said second lead when unconnected to said first base lead and said third lead is connected to said first base lead exceeds the current amplitude through said second lead when said second lead is connected with said first base lead.

8. The method of selecting the unknown collector and emitter leads of an operative PNP type transistor in which the base lead is known which comprises:

(a) alternately connecting the first base lead to one and then to the other of the two remaining second and third unknown leads of a PNP type transistor while applying to the combination a voltage between the connected and unconnected leads of said transistor with the negative polarity of said voltage being applied to the connected leads, (b) comparing the direction and amplitude of current through said second lead of said transistor when said second lead is connected with said first base lead, and when said second lead is unconnected with said first base lead and said third lead is connected with said first base lead, (c) designating said second lead as the collector lead and said third lead as the emitter lead when the current through said second lead is in the direction into said transistor while the amplitude of this current exceeds the amplitude of the current through said second lead when the current is in the direction out of said transistor, (d) and designating said second lead as the emitter lead and said third lead as the collector lead when the current through said second lead is in the direction out of said transistor while the amplitude of this current exceeds the amplitude of the current through said second lead when the current is in the direction into said transistor.

9. The method of selecting the unknown collector and emitter leads of an operative NPN type transistor in which the base lead is known which comprises:

(a) alternately connecting the first base lead to one and then to the other of the two remaining second and third unknown leads of an NPN type transistor while applying to the combination a voltage between the connected and unconnected leads of said transistor with the positive polarity of said voltage being applied to the connected leads, (b) comparing the direction and amplitude of current through said second lead of said transistor when said second lead is connected with said first base lead, and when said second lead is unconnected with said first base lead and said third lead is connected with said first base lead, (c) designating said second lead as the collector lead and said third lead as the emitter lead when the current through said second lead is in the direction out of said transistor while the amplitude of this current exceeds the amplitude of the current through said second lead when the current is in the direction into said transistor, (d) and designating said second lead as the emitter lead and said third lead as the collector lead when the current through said second lead is in the direction into said transistor while the amplitude of the current exceeds the amplitude of the current through said second lead when the current is in the direction out of said transistor.

10. The method for selecting the base, collector and emitter leads of an operative transistor with unknown leads which comprises:

(a) connecting together a selected two of the three leads of a transistor and applying to the combination a D.C. voltage of predetermined sense between the connected and unconnected leads of said transistor, (b) determining whether as a result there is a current through the transistor between the leads to which said voltage is applied, (c) performing the above steps (a) and (b) for the connections of the pairs of leads of the transistor for the remaining two combinations of said leads after disconnecting the previously connected leads with said voltage applied in the same said predetermined sense between the connected and unconnected leads of said transistor, (d) designating as the base lead of said transistor the unconnected lead of the combination of leads which has a result in step (b) different from the results of the remaining two combination of said leads, (e) designating as PNP type transistors those which conduct current in step (b) when the applied voltage has its negative polarity applied to the base lead or do not conduct current when the positive polarity is applied to the base lead, (f) designating as NPN type transistors those which conduct current in step (b) when the applied voltage has its positive polarity applied to the base lead or do not conduct current when the negative polarity is applied to the base lead, (g) alternately connecting the first base lead to one and then to the other of the remaining second and third leads of said transistor while applying to the combination a voltage between the connected and unconnected leads of said transistor with the negative polarity of said voltage being applied to the connected leads when said transistor is selected as a PNP type transistor in step (e) and the positive polarity of said voltage being applied to the connected leads when said transistor is selected as a NPN type transistor in step (f), (h) comparing the direction and amplitude of current through said second lead of said transistor when said second lead is connected with said first base lead, and when said second lead is unconnected with said first base lead and said third lead is connected with said first base lead in step (g), (i) designating said second lead as the collector lead and said third lead as the emitter lead when the current through said second lead is in the direction out of said transistor while the amplitude of this current exceeds the amplitude of the current through said second lead when the current is in the direction into said transistor, (j) and designating said second lead as the emitter lead and said third lead as the collector lead when the current through said second lead is in the direction into said transistor while the amplitude of this current exceeds the amplitude of the current through said second lead when the current is in the direction out of said transistor.

11. The method for selecting the base, collector, and emitter leads of an operative transistor with unknown leads which comprises:

(a) connecting together a selected two of the three leads of a transistor and applying to the combination a D.C. voltage of predetermined sense between the connected and unconnected leads of said transistor, (b) determining whether there is a current through the transistor between the leads to which said voltage is applied, (c) performing the above steps (a) and (b) for the connections of the pairs of leads of the transistor for the remaining two combinations of said leads after disconnecting the previously connected leads with said voltage applied in the same said predetermined sense between the connected and unconnected leads of said transistor, (d) designating as the base lead of said transistor the unconnected lead of the combination of leads which:
  (1) resulted in the absence of current between the leads to which said voltage was applied provided that no other combinations of leads also resulted in the absence of current, or
  (2) resulted in current between the leads to which said voltage was applied provided that no other combinations of leads also resulted in current, (e) designating as PNP type transistors those which conduct current in step (b) when the applied voltage has its negative polarity connected to the base lead or those which do not conduct current in step (b) when the applied voltage has its positive polarity applied to the base lead, (f) designating as NPN type transistors those which conduct current in step (b) when the applied voltage has its positive polarity connected to the base lead or those which do not conduct current in step (b) when the applied voltage has its negative polarity applied to the base lead, (g) alternately connecting the first base lead to one and then to the other of the remaining second and third leads of said transistor while applying to the combination a voltage between the connected and unconnected leads of said transistor with the negative polarity of said voltage being applied to the connected leads when said transistor is selected as a PNP type transistor in step (e) and the positive polarity of said voltage being applied to the connected leads when said transistor is selected as an NPN type transistor in step (f), (h) comparing the direction and amplitude of current through said second lead of said transistor when said second lead is connected with said first base lead, and when said second lead is unconnected with said first base lead and said third lead is connected with said first base lead in step (g), (i) designating said second lead as the collector lead and said third lead as the emitter lead when the current through said second lead is in the direction out of said transistor while the amplitude of this current exceeds the amplitude of the current through said second lead when the current is in the direction into said transistor, (j) and designating said second lead as the emitter lead and said third lead as the collector lead when the current through said second lead is in the direction into said transistor while the amplitude of this current exceeds the amplitude of the current through said second lead when the current is in the direction out of said transistor.

12. The method of testing a PNP or NPN type transistor with unknown leads which comprises:
  (a) connecting together a selected two of the three leads of a PNP or NPN type transistor and applying to the combination a D.C. voltage of predetermined sense between the connected and unconnected leads of said transistor,
  (b) performing step (a) for the connections of the pairs of leads of the transistor for each of the remaining two combinations of said leads after disconnecting from each other the previously connected leads,
  (c) determining for which of the three possible combinations of leads of said transistors provided by step (a) there results an absence of current through the transistor between the leads to which said voltage is applied when the positive polarity of said voltage is applied to the unconnected lead of a PNP type transistor while for an NPN type transistor the negative polarity is applied to the unconnected lead, or for which combinations of leads there results a current through the transistor between the leads to which said voltage is applied when the negative polarity of said voltage is applied to the unconnected lead of a PNP type transistor while for an NPN type transistor the positive polarity is applied to the unconnected lead,
  (d) and designating said transistor as inoperative when in step (c) there are determined more than one or no combination of leads which results in an absence of current when the positive polarity of said voltage is applied to the unconnected lead of a PNP type transistor and when for an NPN type transistor the negative polarity is applied to the unconnected lead, or more than one or no combination of leads results in current through said transistor when the negative polarity of said voltage is applied to the unconnected lead of a PNP type transistor and when for an NPN type transistor the positive polarity is applied to the unconnected lead.

13. The method of testing a PNP or NPN type transistor with unknown leads which comprises:
  (a) connecting together a selected two of the three leads of a PNP or NPN type transistor and applying to the combination a D.C. voltage of predetermined sense between the connected and unconnected leads of said transistor,
  (b) performing step (a) for the connections of the pairs of leads of the transistor for each of the remaining two combinations of said leads after disconnecting from each other the previously connected leads,
  (c) determining for which of the three possible combinations of leads of said transistor provided by step (a) there results an absence of current through the transistor between the leads to which said voltage is applied when the negative polarity of said voltage is applied to the unconnected lead of a PNP type transistor while for an NPN type transistor the positive polarity is applied to the unconnected lead, or for which combinations of leads there results a current through the transistor between the leads to which said voltage is applied when the positive polarity of said voltage is applied to the unconnected lead of a PNP type transistor while for an NPN type transistor the negative polarity is applied to the unconnected lead,
  (d) and designating said transistor as inoperative when in step (c) there are determined more or less than two combinations of leads which result in an absence of current when the negative polarity of said voltage is applied to the unconnected lead of a PNP type transistor and when for an NPN type transistor the positive polarity is applied to the unconnected lead, or more or less than two combinations of leads result in current through said transistor when the positive polarity of said voltage is applied to the unconnected lead of a PNP type transistor and when for an NPN type transistor the negative polarity is applied to the unconnected lead.

14. The method testing a PNP or NPN type transistor having three leads which comprises:
  (a) connecting together the first and second leads of a PNP or NPN type transistor and applying to the combination a D.C. voltage of predetermined sense between the connected first and second leads and the unconnected third lead of said transistor,
  (b) determining whether as a result there is a current through the transistor between the leads to which said voltage is applied,
  (c) connecting together the first and third leads of said transistor and applying to the combination said D.C. voltage of predetermined sense between the connected first and third leads and the unconnected second lead of said transistor and performing step (b),
  (d) connecting together the second and third leads of said transistor and applying to the combination said D.C. voltage of predetermined sense between the connected second and third leads and the unconnected first lead of said transistor and performing step (b), (e) designating as the base lead of said transistor the unconnected lead of the combination of leads for which there results the absence for a PNP type transistor and the presence for an NPN type transistor of current through said transistor in steps (b), (c) and (d) when the positive polarity of said voltage is applied to the unconnected lead, or selecting as the base lead the unconnected lead of the combination of leads for which there results a current through said transistor for a PNP type transistor and the absence of current for an NPN type transistor in steps (b), (c) and (d) when the negative polarity of said voltage is applied to the unconnected lead, (f) designating said transistor as inoperative when in step (e) there are determined to be more than one base lead or no base lead and terminating the test, (g) sequentially connecting the found first base lead to one of the two remaining second and third leads of said transistor while applying to the combination a voltage between the connected and unconnected leads of said transistor with the negative polarity of said voltage being applied to the connected leads of a PNP type transistor while for an NPN type transistor a positive polarity is applied to the connected leads, (h) comparing the amplitude of current through said second lead of said transistor when said second lead is connected with said first base lead, and when said second lead is unconnected with said first base lead and said third lead is connected with said first base lead, (i) designating said second lead as the collector lead and said third lead as the emitter lead when the current amplitude through said second lead when connected to said first base lead exceeds the current amplitude through said second lead when said second lead is unconnected to said first base lead and said third lead is connected to said first base lead, (j) designating said second lead as the emitter lead and said third lead as the collector lead when the current amplitude through said second lead when unconnected to said first base lead and said third lead is connected to said first base lead exceeds the amplitude through said second lead when said second lead is connected with said first base lead, (k) and designating said transistor as inoperative when in step (h) the comparison determines that there is no difference in the current amplitude for the two stated connections of said first base lead.

15. The method of claim 14 in which:

(l) the collector or emitter lead of said transistor is determined to be open when more than one base is determined and the base lead of said transistor is determined to be shorted when no base lead is found in step (e) when the positive polarity of said voltage is applied to the unconnected lead for a PNP type transistor while for an NPN type transistor a negative polarity is applied to the unconnected lead, (m) and the collector and emitter leads of said transistor are determined to be shorted when more than one base is determined and the base lead of said transistor is determined to be open when no base lead is found in step (e) when the negative polarity of said voltage is applied to the unconnected lead for a PNP type transistor while for an NPN type transistor a positive voltage is applied to the unconnected lead.

16. Means for selecting the base lead of an operative transistor with unknown leads comprising:

(a) means for receiving the first, second and third leads of an operative transistor with unknown leads, (b) switching means for sequentially connecting together during first, second and third intervals respectively the first and second leads, the first and third leads, and the second and third leads of a transistor received by said first means, (c) means applying a voltage of predetermined sense between the connected and unconnected leads of said transistor during said intervals, (d) means for detecting the presence of current through said transistor between the leads to which said voltage is applied during said intervals, (e) a base line;

(f) and means responsive to said fourth means (d) for selecting the base lead as the unconnected lead during the interval of said switching means during which said detecting means detects current through said transistor and connecting said base lead to said base line.

17. The means of claim 16 for determining the base lead of a PNP type transistor in which:

(g) the voltage of said third means (c) is applied with its negative polarity to the unconnected lead of said transistor during each of said intervals.

18. The means of claim 16 for determining the base lead of an NPN type transistor in which:

(g) the voltage of said third means (c) is applied with its positive polarity to the unconnected lead during each of said intervals.

19. Means for selecting the unknown collector and emitter leads of an operative transistor in which the base lead is known which comprises:

(a) means for receiving the first base lead and second and third unknown leads of an operative transistor, (b) switching means for alternately connecting together during sequential first and second intervals respectively the first and second leads and the first and third leads of a transistor received by said first means, (c) means applying a voltage of predetermined sense between the connected and unconnected leads of said transistor during said intervals, (d) means detecting the presence of current through said transistor between the leads to which said voltage is applied during said intervals, (e) a collector line and emitter line, (f) and means responsive to said fourth means (d) for selecting the collector lead and the emitter lead and connecting said collector lead and emitter lead respectively with said collector line and emitter line.

20. Means for selecting the unknown collector and emitter leads of an operative transistor in which the base lead is known which comprises:

(a) first means having first, second and third elements for respectively receiving the first base lead and second and third unknown leads of an operative transistor, (b) energizing means having first and second terminals for delivering an alternating voltage, (c) first and second impedance means respectively connecting the second and third elements of said first means (a) with the first and second terminals of said energizing means, (d) first and second unidirectional conducting means joining the first element of said first means (a) respectively with the first and second terminals of said energizing means, (e) and means for detecting the presence of current flow through said transistor between the elements of said first means (a) to which the voltage of said energizing means is applied for the purpose of designating the collector and emitter leads of the transistor received by said first means.

21. The means of claim 20 in which said first and second unidirectional conducting means are first and second crystal diode units.

22. The means of claim 20 in which said last means (e) detects the polarity and average voltage drop across said first impedance element for selecting the collector and emitter leads of the transistor received by said first means (a).

23. The means of claim 22 including:
   (f) switching means joining said first and second unidirectional conducting means with a predetermined polarity between said first element of said first means (a) and respectively said first and second terminals of said energizing means during a first interval, and selectively reversing the polarity of said unidirectional conducting means.

24. Means for selecting the unknown collector and emitter leads of an operative PNP type transistor in which the base lead is known which comprises:
   (a) first means having first, second and third elements for respectively receiving the first base lead and second and third unknown leads of an operative PNP type transistor,
   (b) energizing means having first and second terminals for delivering an alternating voltage,
   (c) first and second impedance means respectively connecting the second and third elements of said first means (a) with the first and second terminals of said energizing means,
   (d) first and second unidirectional conducting means joining the first element of said first means respectively with the first and second terminals of said energizing means and each poled to conduct current in the direction from its respective said terminal to the first element of said first means (a),
   (e) and means for detecting the signal polarity and average voltage drop across said first impedance element for the purpose of determining the collector and emitter leads of the transistor received by said first means (a).

25. The means of claim 24 including:
   (f) switching means connecting said second and third elements of said first means (a) respectively with said first and second impedance means during a first interval and connecting said second and third elements of said first means (a) respectively with said second and first impedance means during the subsequent second interval.

26. Means for selecting the unknown collector and emitter leads of an operative NPN type transistor in which the base lead is known which comprises:
   (a) first means having first, second and third elements for respectively receiving the first base lead and second and third unknown leads of an operative NPN type transistor,
   (b) energizing means having first and second terminals for delivering an alternating voltage,
   (c) first and second impedance means respectively connecting the second and third elements of said first means (a) with the first and second terminals of said energizing means,
   (d) first and second unidirectional conducting means joining the first element of said first means (a) respectively with the first and second terminals of said energizing means and each poled to conduct current to its respective said terminal from the first element of said first means (a),
   (e) and means for detecting the signal polarity and average voltage drop across said first impedance element for the purpose of determining the collector and emitter leads of the transistor received by said first means (a).

27. The means of claim 26 including:
   (f) switching means connecting said second and third elements of said first means (a) respectively with said first and second impedance means during a first interval and connecting said second and third elements of said first means (a) respectively with said second and first impedance means during the subsequent second interval.

28. Means for selecting the base, collector and emitter leads of an operative transistor with unknown leads comprising:
   (a) means having first, second and third elements for respectively receiving the first, second and third leads of an operative transistor,
   (b) switching means for sequentially connecting together during first, second and third intervals respectively the first and second leads, the first and third leads, and the second and third leads of a transistor received by said first means (e),
   (c) means applying a voltage of predetermined sense between the connected and unconnected leads of said transistor during said first, second and third intervals,
   (d) means detecting the presence of current through said transistor between the leads to which said voltage is applied during said first, second and third intervals for selecting the base lead of said transistor,
   (e) and means alternately connecting together during a subsequent fourth interval the found base lead and the first of said remaining two leads, and the found base lead and the second of said remaining two leads of said transistor during sequential periods of said fourth interval,
   (f) said energizing means applying a voltage of predetermined sense between the connected and unconnected leads of said transistor during said periods,
   (g) said detecting means detecting the presence of current through said transistor between the leads to which said voltage is applied during said fourth interval for selecting the collector and emitter leads of said transistor.

29. Means for testing and selecting the base, collector and emitter leads of a PNP type transistor with unknown leads comprising:
   (a) first means having first, second and third elements for respectively receiving the first, second and third leads of a PNP type transistor,
   (b) switching means for sequentially connecting together during first, second and third intervals respectively the first and second leads, the first and third leads, and the second and third leads of a transistor received by said first means (a),
   (c) means applying a voltage between the connected and unconnected leads of said transistor during said first, second and third intervals with the negative polarity of said voltage being applied to the unconnected lead of said transistor during each of said intervals,
   (d) means detecting the presence of current through said transistor between the leads to which said voltage is applied during said first, second and third intervals for selecting the base lead of said transistor,
   (e) means selecting the base lead as the unconnected lead during the interval of said switching means during which said detecting means detects the absence of current through said transistor,
   (f) said switching means during the fourth interval succeeding the said third interval conecting the found base lead of said transistor to a base line and said remaining leads respectively to first and second lines,
   (g) said energizing means having first and second terminals for delivering an alternating voltage,
   (h) first and second impedance means respectively connecting the first and second lines of said switching means with the first and second terminals of said energizing means,
   (i) first and second unidirectional means joining the base line of said switching means respectively with the first and second terminals of said energizing means and each poled to conduct current from its respective said terminal to said base line,
   (j) and means for detecting the signal polarity and average voltage drop across said first impedance element for selecting the collector and emitter leads of the transistor received by said first means (a).

30. The means of claim 29 in which:
(k) said switching means during the fifth interval succeeding said fourth interval reverses the connections between the remaining leads after the base lead is found and the first and second lines of said switching means.

31. The means of claim 29 including:
(k) means indicating said transistor received by said first means (a) is inoperative when more or less than one base lead is found during said first, second and third intervals,
(l) and means indicating said transistor received by said first means (a) is inoperative when the detecting means fails to detect said collector and emitter leads during an interval subsequent to said third interval.

32. Means for testing and selecting the base, collector and emitter leads of an NPN type transistor with unknown leads comprising:
(a) first means having first, second and third elements for respectively receiving the first, second and third leads of an NPN type transistor,
(b) switching means for sequentially connecting together during first, second and third intervals respectively the first and second leads, the first and third leads, and the second and third leads of a transistor received by said first means (a),
(c) means applying a voltage between the connected and unconnected leads of said transistor during said first, second and third intervals with the positive polarity of said voltage being applied to the unconnected lead of said transistor during each of said intervals,
(d) means detecting the presence of current through said transistor between the leads to which said voltage is applied during said first, second and third intervals for selecting the base lead of said transistor,
(e) means selecting the base lead as the unconnected lead during the interval of said switching means during which said detecting means detects the presence of current through said transistor,
(f) said switching means during the fourth interval succeeding the said third interval connecting the found base lead of said transistor to a base line and said remaining leads respectively to first and second lines,
(g) said energizing means having first and second terminals for delivering an alternating voltage,
(h) first and second impedance means respectively connecting the first and second lines of said switching means with the first and second terminals of said energizing means,
(i) first and second unidirectional means joining the base line of said switching means respectively with the first and second terminals of said energizing means and each poled to conduct current to its respective said terminal from said base line,
(j) and means for detecting the signal polarity and average voltage drop across said first impedance element for selecting the collector and emitter leads of the transistor received by said first means (a).

33. The means of claim 32 in which:
(k) said switching means during the fifth interval succeeding said fourth interval reverses the connections between the remaining leads after the base lead is found and the first and second lines of said switching means.

34. The means of claim 32 including:
(k) means indicating said transistor received by said first means (a) is inoperative when more or less than one base lead is found during said first, second and third intervals,
(l) and means indicating said transistor received by said first means (a) is inoperative when the detecting means fails to detect said collector and emitter leads during an interval subsequet to said third interval.

References Cited

UNITED STATES PATENTS

| 2,699,528 | 1/1955 | Periale | 324—51 X |
| 2,899,642 | 8/1959 | Hussey | 324—158 |
| 3,034,051 | 5/1962 | Higgins, Jr. | 324—73 |

OTHER REFERENCES

G.E. Transistor Manual (Sixth Edition), March 1962, p. 223.

I.B.M. Technical Bulletin, vol. 4, No. 4, September 1961, p. 33.

RUDOLPH V. ROLINEC, *Primary Examiner.*

WALTER L. CARLSON, ARCHIE R. BORCHELT,
*Examiners.*

E. L. STOLARUM, *Assistant Examiner.*